US012744147B2

(12) United States Patent
Watanabe et al.

(10) Patent No.: US 12,744,147 B2
(45) Date of Patent: Sep. 22, 2026

(54) COIL DEVICE

(71) Applicant: TDK CORPORATION, Tokyo (JP)

(72) Inventors: Taichi Watanabe, Tokyo (JP); Keigo Higashida, Tokyo (JP); Hanako Yoshino, Tokyo (JP)

(73) Assignee: TDK CORPORATION, Tokyo (JP)

( * ) Notice: Subject to any disclaimer, the term of this patent is extended or adjusted under 35 U.S.C. 154(b) by 828 days.

(21) Appl. No.: 18/177,419

(22) Filed: Mar. 2, 2023

(65) Prior Publication Data

US 2023/0290558 A1 Sep. 14, 2023

(30) Foreign Application Priority Data

Mar. 14, 2022 (JP) ................................ 2022-039605

(51) Int. Cl.
*H01F 17/04* (2006.01)
*H01F 27/28* (2006.01)
*H01F 27/29* (2006.01)

(52) U.S. Cl.
CPC ....... *H01F 17/045* (2013.01); *H01F 27/2828* (2013.01); *H01F 27/29* (2013.01)

(58) Field of Classification Search
CPC .................................................. H01F 27/2828
USPC ................................................ 336/192, 221
See application file for complete search history.

(56) References Cited

U.S. PATENT DOCUMENTS

2021/0280359 A1 9/2021 Yoshino et al.

FOREIGN PATENT DOCUMENTS

| | | |
|---|---|---|
| JP | 2006-261572 A | 9/2006 |
| JP | 2017-069349 A | 4/2017 |
| JP | 2021-141286 A | 9/2021 |

OTHER PUBLICATIONS

English translation of JP2017069349 (Year: 2017).*
English translation of JP2016134848 (Year: 2016).*
English translation of JP2006121013 (Year: 2006).*

* cited by examiner

*Primary Examiner* — Ronald Hinson
(74) *Attorney, Agent, or Firm* — Oliff PLC

(57) ABSTRACT

A coil device includes first and second wires, a drum core having a winding part around which the wires are wound. The drum core has first and second flanges formed at different ends of the winding core part along the first axis. First and second terminals which connect with the first wire are formed at the first flange, and third and fourth terminals which connect with the second wire are formed at the second flange. The first wire has a first coil part having a winding width W1 wound around the winding core part, and the second wire has a second coil part having a winding width W2 wound around the winding core part. The first coil part is arranged closer to the first flange and it is spaced apart from the second coil part by taking a distance W3, and W3>W1 or W3>W2 is satisfied.

12 Claims, 14 Drawing Sheets

COIL DEVICE

TECHNICAL FIELD

The present invention relates to a coil device which can be used for example as a noise filter.

BACKGROUND

A noise filter having two coils to a winding core part of a core is already known (Patent Document 1). In this noise filter, each coil is wound around a winding part of the winding core part at different positions. Thereby, it makes easy for each coil to have about the same lengths, and the two coils can attain the same characteristics.

However, such noise filter has a structure that a lead wire part from one of the coils is close to the other coil, hence an excess stray capacitance is generated.

[Patent Document 1] JP Patent Application Laid Open No. 2006-261572

SUMMARY

The present invention is achieved in view of such circumstances, and the object is to provide a coil device with reduced stray capacitance.

In order to achieve the above-mentioned object, a coil device according to the present invention includes a first wire, a second wire, and a drum core having a winding core part where the first wire and the second wire are wrapped around;

wherein the drum core has a first flange at one end along a first axis of the winding core part and a second flange at the other end along the first axis of the winding core part;

the first flange has a first terminal and a second terminal connecting to the first wire;

the second flange has a third terminal and a fourth terminal connecting to the second wire;

the first wire has a first coil part wound around the winding core part by pressing a back of the first coil part towards the winding core part;

the first coil part has a first winding width W1 defined by components along the first axis which is a distance between a first outer winding wire portion positioned closest to the first flange and a first inner winding wire portion positioned furthest from the first flange;

the second wire has a second coil part wound around the winding core part by pressing a back of the second coil part towards the winding core part;

the second coil part has a second winding width W2 defined by components along the first axis which is a distance between a second outer winding wire portion positioned closest to the second flange and a second inner winding wire portion positioned furthest from the second flange;

the first coil part is arranged at a position closer to the first flange and spaced apart from the second coil part by a distance W3 defined by components along the first axis between the first inner winding wire portion and the second inner winding wire portion; and W3>W1 or W3>W2 is satisfied.

By configuring as such, both ends of each wire are connected to the terminals arranged at the flanges close to the coil parts; and each wire is pulled out by taking sufficient distance from the coil part which is formed by the other wire. Also, a sufficient distance is taken between each coil part. As such, since a sufficient distance is secured between one wire and the other wire, a stray capacitance of the coil device can be reduced.

Preferably, a first connecting position where the first terminal and the first wire connect and a second connecting position where the second terminal and the first wire connect may be arranged at a first direction side along a second axis perpendicular to the first axis of the first flange, and a third connecting position where the third terminal and the second wire connect and a fourth connecting position where the fourth terminal and the second wire connect may be arranged at the first direction side along the second axis of the second flange.

As such, by arranging the connecting positions where the wires and the terminals connect at one direction along the second axis, the coil device can be easily mounted on a substrate and so on, and also a structure which forms a closed magnetic circuit can be easily employed by using a plate core.

Preferably, the first connecting position may be arranged at an opposite side of the second connecting position while placing a connecting portion connecting the first flange and the winding core part between the first connecting position and the second connecting position along a direction of the third axis being perpendicular to the first axis and the second axis; and the third connecting position may be arranged at an opposite side of the fourth connecting position while placing a connecting portion connecting the second flange and the winding core part between the third connecting position and the fourth connecting position along the direction of the third axis.

By configuring as such, both ends of each wire can be pulled out from the coil part formed to the winding core part towards both sides along the third axis direction such that both ends of each wire are away from each other.

Preferably, the first wire may bend at a first winding end part which is one end of the first coil part towards the first connecting position and away from the first coil part, the first wire may bend at a second winding end part which is the other end of the first coil part towards the second connecting position and away from the first coil part, the second wire may bend at a third winding end part which is one end of the second coil part towards the third connecting position and away from the second coil part, and the second wire may bend at a fourth winding end part which is the other end of the second coil part towards the fourth connecting position and away from the second coil part.

By bending the wire at the winding end part such that the wire is pulled out away from the coil part, a sufficient distance can be secured between the lead wire part and the coil part, and a stray capacitance can be reduced.

Preferably, the first terminal may include a first terminal first portion having a plane perpendicular to the second axis, a first terminal second portion arranged at an opposite side of the first terminal first portion across the first flange along the direction of the second axis and has a plane parallel to the first terminal first portion, and a first connection part connecting the first terminal first portion and the first terminal second portion;

the second terminal may include a second terminal first portion having a plane perpendicular to the second axis, a second terminal second portion arranged at an opposite side of the second terminal first portion across the first flange along the direction of the second axis and has a plane parallel to the second terminal first portion, and a second connection part connecting the second terminal first portion and the second terminal second portion;

the third terminal may include a third terminal first portion having a plane perpendicular to the second axis, a third terminal second portion arranged at an opposite side of the third terminal first portion across the second flange along the direction of the second axis and has a plane parallel to the third terminal first portion, and a third connection part connecting the third terminal first portion and the third terminal second portion; and the fourth terminal may include a fourth terminal first portion having a plane perpendicular to the second axis, a fourth terminal second portion arranged at an opposite side of the fourth terminal first portion across the second flange along the direction of the second axis and has a plane parallel to the fourth terminal first portion, and a fourth connection part connecting the fourth terminal first portion and the fourth terminal second portion.

By configuring as such, the terminal can hold the flange from the both sides along the second axis direction, the coil device can be easily assembled, and a strong coil device can be produced.

Preferably, a first terminal second portion, a second terminal second portion, a third terminal second portion, and a fourth terminal second portion may be arranged on a same plane in a mountable way which is perpendicular to the second axis and at a second direction side which is an opposite side of the first direction side along the second axis.

By configuring as such, the coil device can be easily mounted by placing the second direction side along the second axis on a substrate and so on. Also, since the connecting position is arranged at the opposite side to the mounting surface across the flange, the coil device can be stably mounted on a substrate and so on.

Preferably, the winding core part may have a flat plane to the first direction side along the second axis. Since such winding core part does not have an intermediate flange which separates the coil parts, an influence of a magnetic flux which enters between each coil part can be reduced.

Preferably, the coil device may include a plate core magnetically connecting the first flange and the second flange. By configuring as such, a closed magnetic circuit can be formed using the drum core and the plate core.

Preferably, the plate core may have a flat plate-like core base surface which opposes the winding core part. As such, since the base surface of the plate core is flat, an influence of a magnetic flux which enters between the coil parts can be reduced.

BRIEF DESCRIPTION OF THE SEVERAL VIEWS OF THE DRAWING(S)

DETAILED DESCRIPTION

Hereinbelow, the present invention is described based on the embodiments shown in the figures.

First Embodiment (Overall Configuration of Coil Device)

As one embodiment of the coil device according to the present embodiment, for example, overall configuration of a differential mode inductor which has a function as a noise filter will be described.

Figure 1:
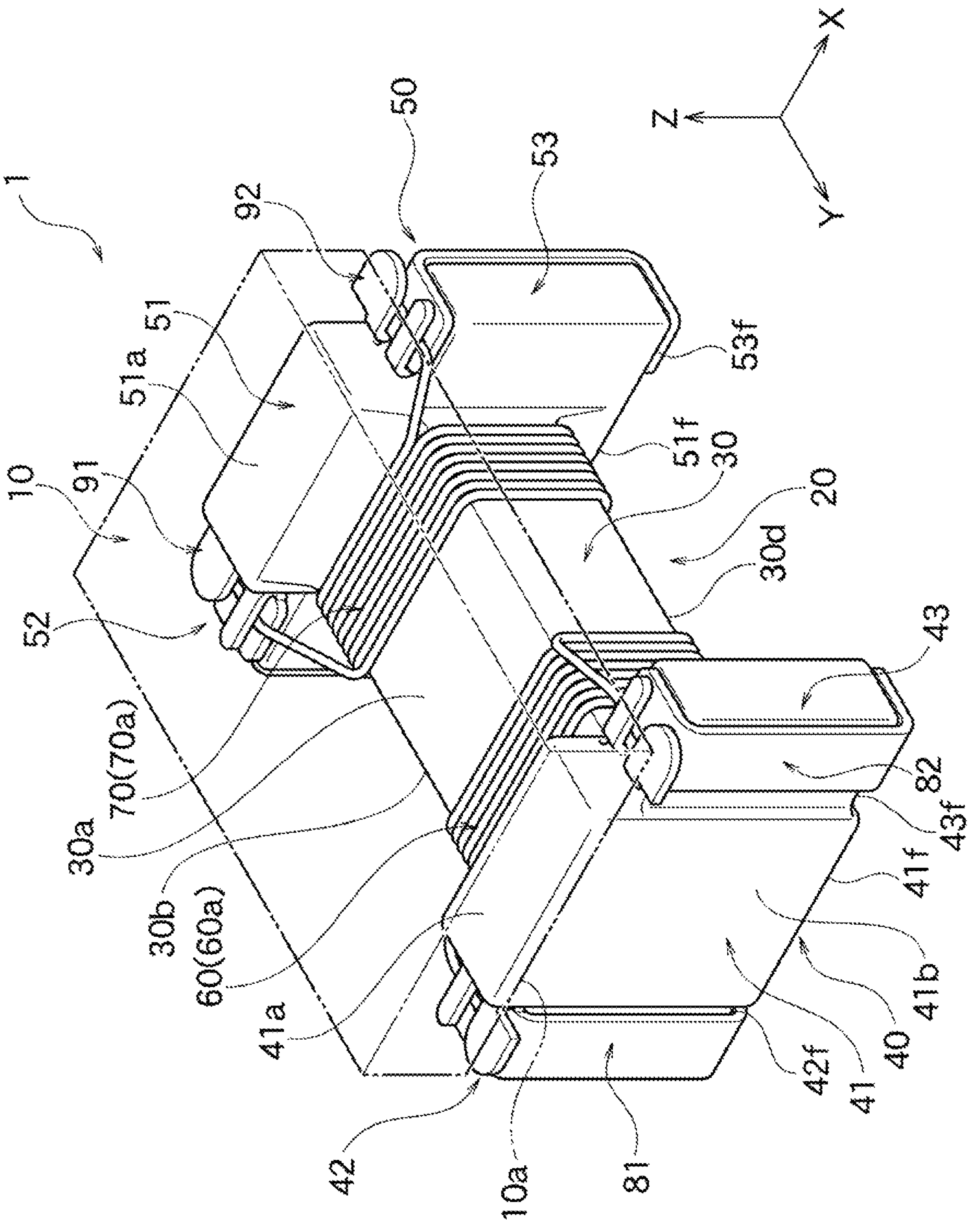
FIG. 1 is a schematic perspective diagram showing a configuration of a coil device according to one embodiment of the present invention.

As shown in FIG. 1, a coil device 1 according to the present embodiment has roughly a rectangular parallelepiped shape. The coil device 1 has a first wire 60, a second wire 70, a drum core 20 having a winding core part 30 to which the first wire 60 and the second wire 70 are wound around, and a plate core 10.

An outer size of the coil device 1 is, for example, a length in X-axis direction of 4.3 to 4.7 mm×a height in Z-axis direction of 2.6 to 3.0 mm×a width in Y-axis direction of 3.0 to 3.4 mm; however, the outer size of the coil device 1 is not limited to this.

The drum core 20 includes the winding core part 30 extending along Y-axis, a first flange 40 provided at one end of the winding core part 30, and a second flange 50 provided at the other end of the winding core part 30. In the present specification, the direction from the second flange 50 to the first flange 40 of the winding core part 30 is referred as Y-axis positive direction, and the opposite direction is referred as Y-axis negative direction. Note that, X-axis, Y-axis, and Z-axis are perpendicular to each other. In the present embodiment, a first axis is Y-axis, and a second axis is Z-axis.

Figure 3:
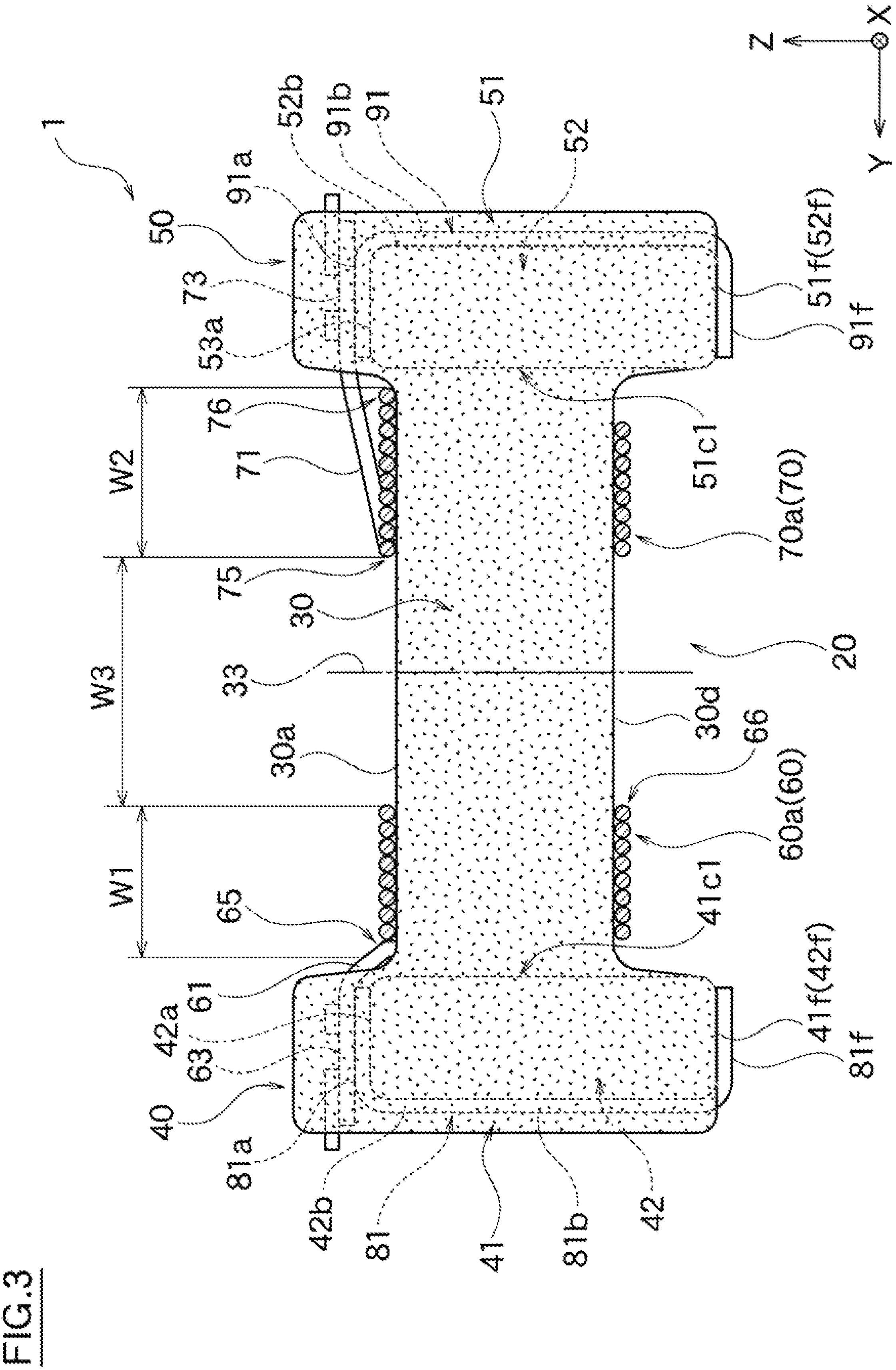
FIG. 3 is a cross section diagram at line shown in FIG. 2A.

As show in FIG. 3, a cross section in YZ axis of the winding core part 30 is roughly a rectangular shape; and as shown in FIG. 1, the winding core part 30 has a rectangular parallelepiped shape which includes a flat face 30*a*, a first side face 30*b*, a second side face 30*c*, and a base face 30*d* at the outer face of the winding core 30. The first side face 30*b* and the second side face 30*c* form the two sides of X-axis direction of the outer face. In the present specification, the direction from the second side face 30*c* to the first side face 30*b* may be referred as X-axis positive direction, and the opposite direction may be referred as X-axis negative direction. Also, the flat face 30*a* and the base face 30*d* form the two sides of Z-axis direction of the outer face. In the present specification, the direction from the base face 30*d* to the flat face 30*a* is referred as Z-axis positive direction, and the opposite direction is referred as Z-axis negative direction. In the present specification, a first direction of Z-axis is a positive direction of Z-axis, and a second direction of Z-axis is a negative direction of Z-axis.

Figure 2A:
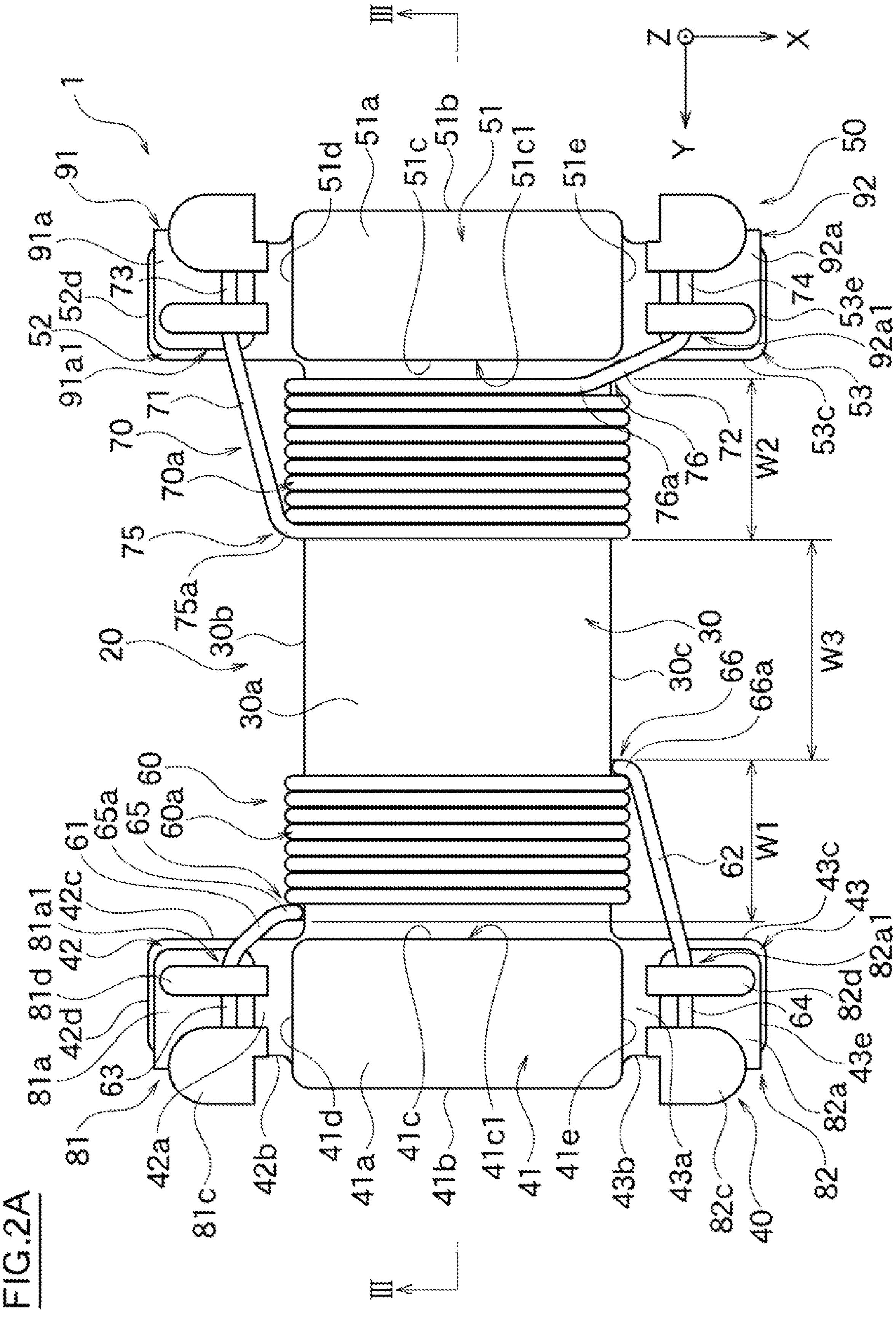
FIG. 2A is a plane diagram of the coil device shown in FIG. 1.

As shown in FIG. 2A, the first flange 40 and the second flange 50 are roughly the same shapes, and are symmetrical across the winding core part 30. The first flange 40 includes a first main body part 41 connected to the winding core part 30, a first sub-body part 42 extending from the first main body part 41 to X-axis positive direction, and a second sub-body part 43 extending from the first main body part 41 to X-axis negative direction.

As shown in FIG. 1, the first main body part 41 is roughly a rectangular shape in which Z-axis direction is a height direction, X-axis direction is a width direction, and Y-axis direction is a length direction. The first main body part 41 has roughly the same width as the winding core part 30. A first main body upper face 41*a* of the first main body part 41 projects out from the flat face 30*a* of the winding core part 30, and the first main body upper face 41*a* is roughly parallel to XY plane. A first main body base face 41*f* of the first main body part 41 faces the first main body upper face 41*a* and it is roughly parallel to XY plane. The first main body upper face 41*a* and the first main body base face 41*f* are perpendicular to a first main body front face 41*b* arranged to Y-axis positive direction side. Also, as shown in FIG. 2A, a first main body back face 41*c* of the first main body part 41 is connected to the winding core part 30. The first side face 41*d* of the first main body part 41 is an extended end part of the first sub-body part 42, and the second side face 41*e* of the first main body part 41 is an extended end part of the second sub-body part 43.

As shown in FIG. 1, the first sub-body part 42 is roughly a rectangular shape in which Z-axis direction is a height direction, X-axis direction is a width direction, and Y-axis direction is a length direction. As shown in FIG. 2A, the first sub-body part 42 connects to the side face 41*d* of the first main body part 41 at X-axis negative direction side of the first sub-body part 42. The first sub-body upper face 42*a* of the first sub-body part 42 is recessed towards Z-axis negative direction side than the first main body upper face 41*a*. The first sub-body base face 42*f* facing the first sub-body upper face 42*a* of the first sub-body part 42 is on the same plane as the first main body base face 41*f*. The first sub-body front face 42*b* configuring the outer face of Y-axis positive direction side of the first sub-body part 42 is arranged roughly parallel to the first main body front face 41*b*; and the first sub-body front face 42*b* is provided to the position which is recessed with respect to the first main body front face 41*b* of the first main body part 41. The first sub-body back face 42*c* of the first sub-body part 42 is on the same plane as the first main body back face 41*c*. The first sub-body side face 42*d* of the first sub-body part 42 intersects with the first sub-body upper face 42*a*, a first sub-body base face, the first sub-body front face 42*b*, and the first sub-body back face 42*c*; and the first sub-body side face 42*d* is arranged parallel to the first side face 41*d* of the first main body part 41.

The second sub-body part 43 is roughly a rectangular shape in which Z-axis direction is a height direction, X-axis direction is a width direction, and Y-axis direction is a length direction. The second sub-body part 43 is connected to the second side face 41*e* of the first main body part 41 at X-axis positive side of the second sub-body part 43; and the second sub-body part 43 and the first sub-body part 42 are plane symmetrical to each other. The second sub-body part 43 includes a second sub-body upper face 43*a* which corresponds to the first sub-body upper face 42*a*, a second sub-body base face which correspond to the first sub-body base face 42*f*, a second sub-body front face 43*b* and the second sub-body back face 43*c* which respectively correspond to the first sub-body front face 42*b* and the first sub-body back face 42*c*, and a second sub-body side face 43*e* which corresponds to the first sub-body side face 42*d*.

Also, as shown in FIG. 2A, the second flange 50 includes a second main body part 51 arranged at the opposite side of the first main body part 41 across the winding core part 30 in Y-axis direction, a third sub-body part 52 extending out to X-axis positive direction as similar to the first sub-body part 42, and a fourth sub-body part 53 extending out to X-axis negative direction as similar to the second sub-body part 43. The second main body part 51 includes a second main body upper face 51*a*, a second main body front face 51*b*, a second main body back face 51*c*, a second main body first side face 51*d*, a second main body second side face 51*e*, and a second main body base face 51*f* (FIG. 1). The third sub-body part 52 includes a third sub-body upper face 52*a*, a third sub-body front face 52*b*, a third sub-body back face 52*c*, a third sub-body side face 52*d*, and a third sub-body base face 52*f* (FIG. 3). The fourth sub-body part 53 includes a fourth sub-body upper face 53*a*, a fourth sub-body front face 53*b*, a fourth sub-body back face 53*c*, a fourth sub-body side face 53*e*, and a fourth sub-body base face 53*f* corresponding to the third sub-body base face 52*f* (FIG. 1).

As shown in FIG. 1, a first terminal 81 and a second terminal 82 are formed to the first flange 40. The first terminal 81 is arranged to the first sub-body part 42, and the second terminal 82 is arranged to the second sub-body part 43. A third terminal 91 and a fourth terminal 92 are formed to the second flange 50. The third terminal 91 is arranged to the third sub-body part 52, and the fourth terminal 92 is arranged to the fourth sub-body part 53. The first terminal 81 and the second terminal 82 are plane symmetric in X-axis direction across the first main body part 41. The first terminal 81 and the third terminal 91 are plane symmetric in Y-axis direction across the winding core part 30. Also, the second terminal 82 and the fourth terminal 92 are plane symmetric in Y-axis direction across the winding core part 30.

Figure 4:
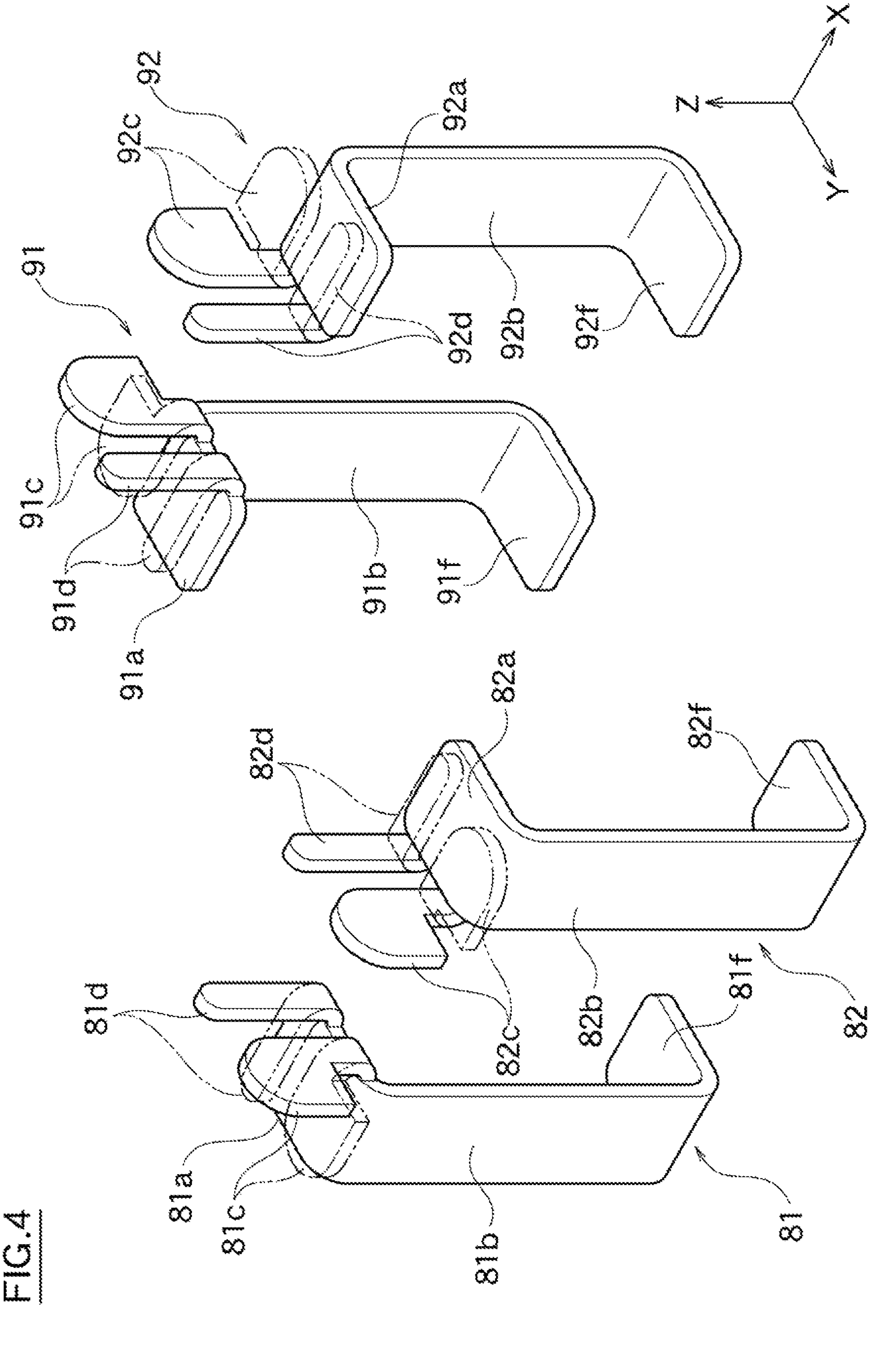
FIG. 4 is schematic perspective diagram showing part of the coil device shown in FIG. 1.

As shown in FIG. 4, the first terminal 81 is roughly a U-like shape, and it includes a first terminal first portion 81*a* and a first terminal second portion 81*f* which are a pair of arm portions of U-like shape, and a first connection part 81*b* which connects the pair of arm portions. The first terminal first portion 81*a* has a plane which is perpendicular to Z-axis. The first terminal second portion 81*f* has a plane which is parallel to the first terminal first portion 81*a*, and the first terminal second portion 81*f* is arranged to the opposite side of the first terminal first portion 81*a* across the first flange 40 shown in FIG. 3 along Z-axis. The first terminal first portion 81*a*, the first terminal second portion 81*f*, and the first connection part 81*b* are formed by bending one metal plate. The first terminal 81 holds the first sub-body upper face 42*a* and the first sub-body base face 42*f* of the first sub-body part 42 shown in FIG. 3 using the first terminal first portion 81*a* and the first terminal second portion 81*f*; and the first terminal 81 is fixed to the first sub-body part 42 while an inner surface of the first connection part 81*b* is in contact with the first sub-body front face 42*b*. Note that, the terminal and the flange may be adhered using a non-conductive adhesive.

Also, as shown in FIG. 2A, the first terminal first portion 81*a* of the first terminal 81 has a first holding piece 81*c* and a second holding piece 81*d* at an area facing against the first side face 41*d* of the first main body part 41. As shown in FIG. 4, the first holding piece 81*c* and the second holding piece 81*d* are bent at a connecting portion of the first terminal first portion 81*a* so that the first holding piece 81*c* and the second holding piece 81*d* contact with the outer face of the first terminal first portion 81*a*.

As shown in FIG. 2A, in the present embodiment, a first lead wire connecting part 63 of the first lead wire part 61 is held between the first holding piece 81*c* and the second holding piece 81*d* and the first terminal first portion 81*a*, thereby the first terminal 81 and the first wire 60 are connected.

As similar to the first terminal 81, the second terminal 82 has a U-like shape, and it includes a second terminal first portion 82*a* which corresponds to the first terminal first portion 81*a*, a second terminal second portion 82*f* which corresponds to the first terminal second portion 81*f*, and a second connection part 82*b* which corresponds to the first connection part 81*b* connecting the pair of arm portions. The second terminal 82 is fixed to the second sub-body part 43, and connect with a second lead wire connecting part 64.

As shown in FIG. 4, similar to the first terminal 81, a third terminal 91 has a U-like shape, and it includes a third terminal first portion 91*a* which corresponds to the first terminal first portion 81*a*, a third terminal second portion 91*f* which corresponds to the first terminal second portion 81*f*, and a third connection part 91*b* which corresponds to the first connection part 81*b*. As shown in FIG. 3, the third terminal 91 is fixed to the third sub-body part 52 while holding the third sub-body upper face 52*a* and the third sub-body base face 52*f* of the third sub-body part 52. As shown in FIG. 2A, similar to the first terminal 81, the third terminal 91 is connected to a third lead wire connecting part 73 of the second wire 60.

As similar to the third terminal 91, the fourth terminal 92 has a U-like shape, and includes a fourth terminal first portion 92*a* which corresponds to the first terminal first portion 81*a*, a fourth terminal second portion 92*f* which corresponds to the first terminal second portion 81*f*, and a fourth connection part 92*b* which corresponds to the first connecting portion 81*b*. The fourth terminal 92 is fixed to the second sub-body part 53, and is connected with the fourth lead wire connecting part 74.

In the present embodiment, the area where the first terminal 81 and the first lead wire connecting part 63 connect is referred as a first connecting position. Also, similar to the first terminal 81, the area where the second terminal 82 and the second lead wire connecting part 64 connect is referred as a second connecting position, the area where the third terminal 91 and the third lead wire connecting part 73 connect is referred as a third connecting position, and the area where the fourth terminal 92 and the fourth lead wire connecting part 74 is referred as a fourth connecting part.

As shown in FIG. 2A, the first wire 60 has the first coil part 60*a* which is wound around the winding core part 30 by pressing the backside of the first coil part 60*a* against the winding core part 30. Specifically, the first winding end part 65*a* of the first coil part 60*a* is arranged at a corner portion which is a boundary between the flat face 30*a* and the first side face 30*b* of the winding core part 30. Regarding the first coil part 60*a*, the wire is wound from the first winding end part 65*a* and then around the outer surface of the winding core part 30 in the order of the first side face 30*b*, the base face, the second side face 30*c*, and the flat face 30*a*; hence the wire is wound from near the first flange 40 towards the second flange 50 side; and the second winding end part 66*a* of the first coil part 60*a* is arranged at a corner portion which is the boundary between the flat face 30*a* and the second side face 30*c*. As shown in FIG. 3, the first coil part 60*a* is arranged closer to the first flange 40 side than a center position 33 of the winding core part 30.

As shown in FIG. 2A, the first wire 60 has the first lead wire part 61 at between the first winding end part 65*a* and the first lead wire connecting part 63. The first wire 60 bends at the first winding end part 65*a* and extends towards the first connecting position 81*a*1 from the first coil part 60*a*. Regarding the present embodiment, in the first coil part 60*a*, the first winding end part 65*a* is arranged at a first outer winding wire portion 65 which is closest to the first connecting position 81*a*1 where the first terminal 81 and the first wire 60 connect.

The first wire 60 has a second lead wire part 62 between a second winding end part 66*a* and the second lead wire connecting part 64. The first wire 60 bends at the second winding end part 66*a*, and extends towards the second connecting position 82*a*1 from the first coil part 60*a*. Regarding the present embodiment, in the first coil part 60*a*, the second winding end part 66*a* is arranged at a first inner winding wire portion 66 which is furthest from the second connecting position 82*a*1 where the second terminal 82 and the first wire 60 connect.

As shown in FIG. 2A, the second wire 70 has the second coil part 70*a* which is wound around the winding core part 30 by pressing the backside of the second coil part 70*a* against the winding core part 30. Specifically, the fourth winding end part 76*a* of the second coil part 70*a* is arranged at a corner portion which is a boundary between the flat face 30*a* and the second side face 30*c* of the winding core part 30. Regarding the second coil part 70*a*, the wire is wound from the fourth winding end part 76*a* and then around the outer surface of the winding core part 30 in the order of the flat face 30*a*, first side face 30*b*, the base face, and the second side face 30*c*, hence the wire is wound from near the second flange 50 towards the first flange 40 side; and the third winding end part 75*a* of the second coil part 70*a* is arranged at a corner portion which is the boundary between the flat face 30*a* and the first side face 30*b*. As shown in FIG. 3, the second coil part 70*a* is arranged closer to the second flange 50 side than a center position 33 of the winding core part 30.

As shown in FIG. 2A, the second wire 70 has a fourth lead wire part 72 between a fourth winding end part 76*a* and the fourth lead wire connecting part 74. The second wire 70 bends at the fourth winding end part 76*a*, and extends towards the fourth connecting position 92*a*1 from the second coil part 70*a*. Regarding the second coil part 70*a*, in the present embodiment, the fourth winding end part 76*a* is arranged at a second outer winding wire portion 76 which is closest to the fourth connecting position **92*a*1 where the fourth terminal 92 and the second wire 70** connect.

The second wire 70 has a third lead wire part 71 between a third winding end part **75*a* and the third lead wire connecting part 73. The second wire 70 bends at the third winding end part 75*a*, and extends towards the third connecting position 91*a*1 from the second coil part 70*a*. Regarding the second coil part 70*a*, in the present embodiment, the third winding end part 75*a* is arranged at a second inner winding wire portion 75 which is closest to the third connecting position 91*a*1 where the third terminal 91 and the second wire 70** connect.

Figure 2B:
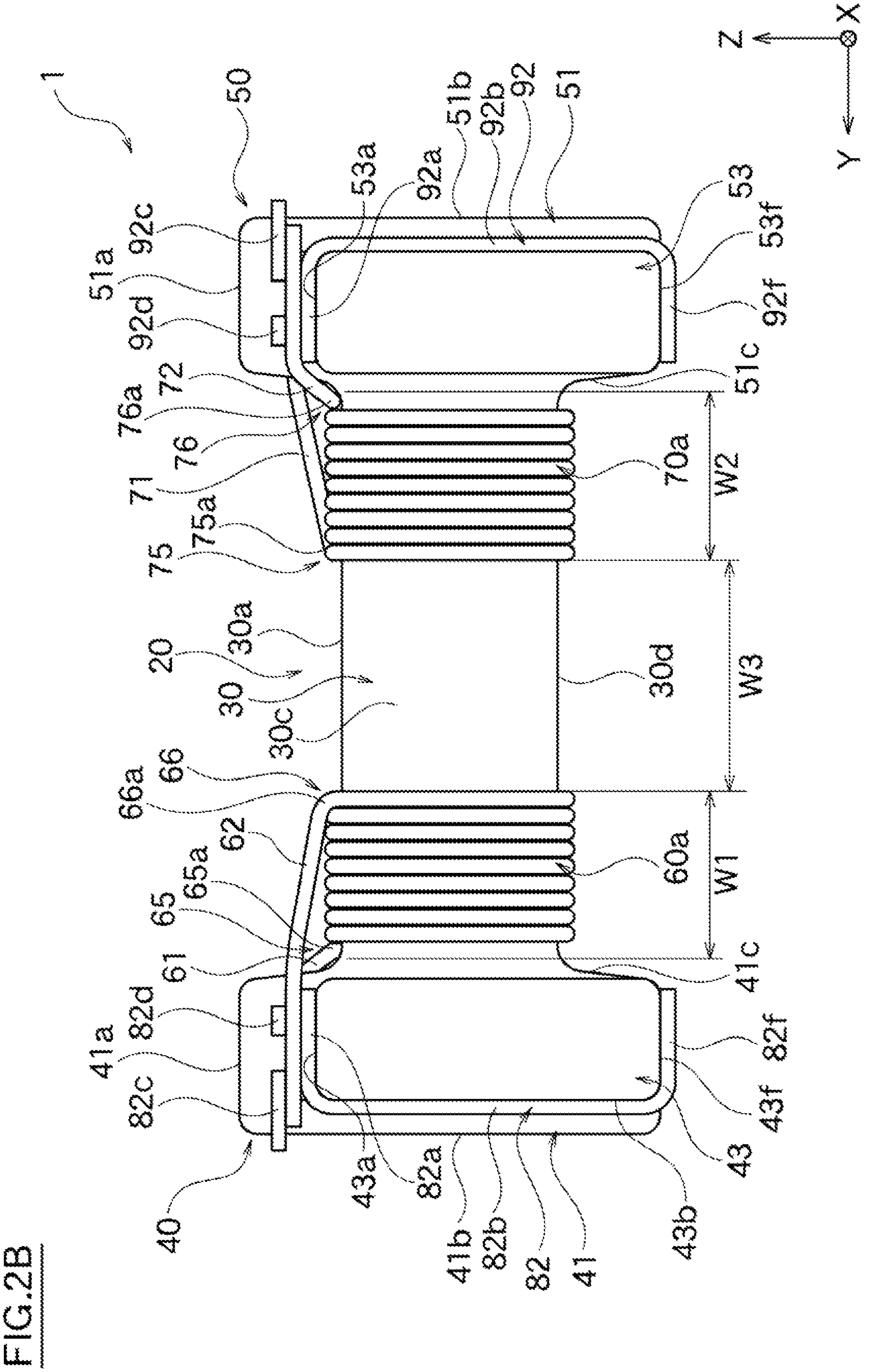
FIG. 2B is a side diagram of the coil device shown in FIG. 1.

As shown in FIG. 2B, in the first coil part **60*a*, the first winding width W1 of the first coil part 60*a* is defined by components along Y-axis which is a distance between the first outer winding wire portion 65 positioned closest to the first flange 40 and the first inner winding wire portion 66 positioned furthest from the first flange 40. Also, in the second coil part 70*a*, a second winding width W2 of the second coil part 70*a* is defined by components along Y-axis which is a distance between a second outer winding wire portion 76 positioned closest to the second flange 50 and the second inner winding wire portion 75 positioned furthest from the second flange 50**.

As shown in FIG. 3, in the present embodiment, the first coil part **60*a* and the second coil part 70*a* are formed by winding one layer of wire. As shown in FIG. 2B, the first winding end part 65*a* is arranged at the first outer winding wire portion 65, and the second winding end part 66*a* is arranged at the first inner winding wire portion 66. Also, the third winding end part 75*a* is arranged at the second inner winding wire portion 75, and the fourth winding end part 76*a* is arranged at the second outer winding wire portion 76**.

Note that, the first coil part **60*a* and the second coil part 70*a* may be formed by winding the wires in a plurality of layers. In case the first coil part is formed by winding the wire in an even number of layers, for example, the first winding end part 65*a* and the second winding end part 66*a*** are positioned at the first outer winding wire portion, and the first layer and second layer of the first coil part are folded over at the first outer winding wire portion.

Also, in the present embodiment, the winding end part and the outer face of the winding core part may have a space in between, however, preferably the winding end part contacts the outer face of the winding core part. When the coil part is formed by winding the wire in a plurality of layers, the winding end part is arranged at the outside of the layer close to the winding core part. In this case, preferably the winding end part contacts with the layer close to the winding core part.

As shown in FIG. 2B, in the present embodiment, the distance W3 formed between the first coil part **60*a* and the second coil part 70*a* is defined by components along Y-axis which is the distance between the first inner winding wire portion 66 and the second inner winding wire portion 75. The first coil part 60*a* is arranged near the first flange 40 and spaced away from the second coil part 70*a*** by the distance W3.

In the present embodiment, the first coil part **60*a* and the second coil part 70*a* are spaced apart so that W3>W1 and W3>W2 are satisfied. As such, by securing a sufficient space between one wire and the other wire, a stray capacitance between the first coil part 60*a* and the second coil part 70*a* is reduced, and a stray capacitance of the coil device 1 can be reduced as well. The lengths of W1, W2, and W3 are not particularly limited as long as the above relationships are satisfied, and for example, W1 is within a range of 0.74 to 0.78 mm, W2 is within a range of 0.73 to 0.75 mm, and W3 is within a range of 1.14 to 1.18 mm. Note that, it may be sufficient just by satisfying either one of the relationships of W3>W1 and W3>W2, however by satisfying both relationships, the characteristics of both of the first coil parts 60*a* and the second coil part 70*a*** can be easily aligned, and a coil suitable as a common mode filter can be produced easily.

In the present embodiment, the number of turns of the first coil part and the second coil part are about the same, however this may be different depending on the use. Note that, the number of turns of the first coil part and the second coil part are about the same means that a proportion of the number of turns is within the range of 0.75 to 1/0.75, and preferably it is 1.

In the present embodiment, the lengths of each of the first lead wire part, the second lead wire part, the third lead wire part, and the fourth lead wire part are different depending on the shapes and the sizes of the winding core part, the first flange, and the second flange; and preferably these are pulled out in short length.

As shown in FIG. 2A, in the present embodiment, the first lead wire part 61 of the first wire 60 is pulled out from the first winding end part **65*a* of the first coil part 60*a* to the direction of the first sub-body part 42 of the first flange 40 where the first terminal 81 is arranged. Also, the second lead wire part 62 of the first wire 60 is pulled out from the second winding end part 66*a* of the first coil part 60*a* to the direction of the second sub-body part 43 of the first flange 40 where the second terminal 82 is arranged. Further, the first coil part 60*a* is arranged near the first flange 40 along Y-axis and it is spaced apart from the second coil part 70*a*. Therefore, the first lead wire part 61 and the second lead wire part 62 can be pulled out without crossing over the second coil part 70*a*, thus it can reduce a stray capacitance generated between the second coil part 70*a* and the first lead wire part 61 and second lead wire part 62**.

As shown in FIG. 2A, in the present embodiment, the third lead wire part 71 of the second wire 70 is pulled out from the third winding end part **75*a* of the second coil part 70*a* to the direction of the third sub-body part 52 of the second flange 50 where the third terminal 91 is arranged. Also, the fourth lead wire part 72 of the second wire 70 is pulled out from the fourth winding end part 76*a* of the second coil part 70*a* to the direction of the fourth sub-body part 53 of the second flange 50 where the fourth terminal 92 is arranged. Further, the second coil part 70*a* is arranged near the second flange 50 along Y-axis and spaced apart from the first coil part 60*a*. Therefore, the third lead wire part 71 and the fourth lead wire part 72 can be pulled out without crossing over the first coil part 60*a*, and thus it can reduce a stray capacitance generated between the first coil part 60*a* and the third lead wire part 71 and fourth lead wire part 72**.

As shown in FIG. 2A, in the present embodiment, the first lead wire connecting part 63 is arranged at the first connecting position **81*a*1, and the second lead wire connecting part 64 is arranged at the second connecting position 82*a*1. The first connecting position 81*a*1 and the second connecting position 82*a*1 are arranged at the positive direction side (the first direction side) along Z-axis of the first flange 40. Also, the third lead wire connecting part 73 is arranged at the third connecting position 91*a*1, and the fourth lead wire connecting part 74 is arranged at the fourth connecting position 92*a*1. The third connecting position 91*a*1 and the fourth connecting position 92*a*1 are arranged at the positive direction side (the first direction side) along Z-axis. The first connecting position 81$a$1 to the fourth connecting position 92$a$1** are arranged on the same plane perpendicular to Z-axis.

As such, by arranging all of the connecting positions at the positive direction side along Z-axis, the negative direction side can be easily mounted as a mounting face on a substrate and so on. Further, such configuration makes it easy to form a closed magnetic circuit by using the plate core 10.

As shown in FIG. 2A, in the present embodiment, the first connecting position 81$a$1 is arranged at the opposite side of the second connecting position 82$a$1 in X-axis direction across a connecting portion 41$c$1 where the first flange 40 and the winding core part 30 connect. The third connecting position 91$a$1 is arranged at the opposite side of the fourth connecting position 92$a$1 in X-axis direction across a connecting portion 51$c$1 where the second flange 50 and the winding core part 30 connect.

That is, in the present embodiment, the both ends of each wire can be pulled out from the coil part formed to the winding core part 30 and it is pulled out to the both directions along X-axis so that the both ends of each wire are away from each other. Hence, regarding the wire, a stray capacitance generated between the coil part and the lead wire part can be reduced.

As shown in FIG. 2A, in the present embodiment, the first winding end part 65$a$ is arranged at the corner which is the boundary between the flat face 30$a$ and the side face 30$b$ of the winding core part 30. That is, among the four corners which are the boundaries between each face of the winding core part 30, the first winding end part 65$a$ is arranged at the corner closest to the first connecting position 81$a$1 of the first terminal 81. The first wire 60 bends at the first winding end part 65$a$ and it is pulled out towards the first connecting position 81$a$1 in a way to space apart from the first coil part 60$a$. By pulling out the wire in such way, the first lead wire part 61 can be shortened, and a stray capacitance generated between the first coil part 60$a$ and the first lead wire part 61 can be reduced.

As shown in FIG. 2A, in the present embodiment, the second winding end part 66$a$ is arranged at the corner which is the boundary between the flat face 30$a$ and the side face 30$c$ of the winding core part 30. That is, among the four corners which are the boundaries between each face of the winding core part 30, the second winding end part 66$a$ is arranged at the corner closest to the second connecting position 82$a$1 of the second terminal 82. The first wire 60 bends at the second winding end part 66$a$, and it is pulled out towards the second connecting position 82$a$1 in a way to space apart from the first coil part 60$a$. By pulling out the wire in such way, the second lead wire part 62 can be shortened, and a stray capacitance generated between the first coil part 60$a$ and the second lead wire part 62 can be reduced.

As shown in FIG. 2A, in the present embodiment, the third winding end part 75$a$ is arranged at the at the corner which is the boundary between the flat face 30$a$ and the side face 30$b$ of the winding core part 30. That is, among the four corners which are the boundaries between each face of the winding core part 30, the third winding end part 75$a$ is arranged at the corner closest to the third connecting position 91$a$1 of the third terminal 91. The second wire 70 bends at the third winding end part 75$a$, and it is pulled out towards the third connecting position 91$a$1 of the third terminal 91 in a way to space apart from the second coil part 70$a$. By pulling out the wire in such way, the third lead wire part 71 can be shortened, and a stray capacitance generated between the second coil part 70$a$ and the third lead wire part 71 can be reduced.

As shown in FIG. 2A, in the present embodiment, the fourth winding end part 76$a$ is arranged at the at the corner which is the boundary between the flat face 30$a$ and the side face 30$c$ of the winding core part 30. That is, among the four corners which are the boundaries between each face of the winding core part 30, the fourth winding end part 76$a$ is arranged at the corner closest to the fourth connecting position 92$a$1 of the fourth terminal 92. The second wire 70 bends at the fourth winding end part 76$a$, and it is pulled out towards the fourth connecting position 92$a$1 of the fourth terminal 92 in a way to space apart from the second coil part 70$a$. By pulling out the wire in such way, the fourth lead wire part 72 can be shortened, and a stray capacitance generated between the second coil part 70$a$ and the fourth lead wire part 72 can be reduced.

In the present embodiment, a cross section of the winding core part which is perpendicular to Y-axis is roughly a square cuboid shape, but it is not particularly limited to this. For example, the cross section of the wining core part perpendicular to Y-axis may be a circular shape, or polygonal shapes other than square shape. Even in case the cross section of the winding core part perpendicular to Y-axis is not a square shape, it is preferable that the winding end part of the wire is arranged so that the length of each lead wire part is short, and pulled out towards the connecting position of the terminal.

As show in FIG. 4, in the present embodiment, the first terminal 81 has a U-like shape which includes the first terminal first portion 81$a$, the first terminal second portion 81$f$, and the first connection part 81$b$ connecting the first terminal first portion 81$a$ and the first terminal second portion 81$f$. Also, the second terminal 82, the third terminal 91, and the fourth terminal 92 are structured as similar to the first terminal 81. As shown in FIG. 1, these terminals can be installed to the first flange 40 or the second flange 50 by holding from the both sides along Z-axis direction. Therefore, the terminal can be easily and firmly installed to the flange, and the coil device is strengthened even more.

As shown in FIG. 4, in the present embodiment, the first terminal second portion 81$f$, the second terminal second portion 82$f$, the third terminal second portion 91$f$, and the fourth terminal second portion 92$f$ are arranged to the negative direction side along Z-axis. Also, the first terminal second portion 81$f$, the second terminal second portion 82$f$, the third terminal second portion 91$f$, and the fourth terminal second portion 92$f$ are arranged on the same XY-plane. The negative direction side along Z-axis of the first terminal second portion 81$f$, the second terminal second portion 82$f$, the third terminal second portion 91$f$, and the fourth terminal second portion 92$f$ are flat faces, and thus the coil device can be easily mounted on a substrate and so on. Also, the mounting face of the coil device is arranged at the opposite side to the connecting position of the terminal and the wire across the flange in Z-axis direction, thus the coil device can be stably mounted on a substrate and so on.

As shown in FIG. 2B, in the present embodiment, the positive direction side of the winding core part 30 along Z-axis is the flat face 30$a$. That is, in the winding core part 30, in regards with the area between the first coil part 60$a$ and the second coil part 70$a$, the outer surface is on the same plane, an intermediate flange and so on which is placed between the first coil part 60$a$ and the second coil part 70$a$ is not formed between the first coil part 60$a$ and the second coil part 70$a$. As such, the Z-axis positive direction side of the winding core part 30 is the flat face 30*a*, hence magnetic flux hardly enters between the first coil part 60*a* and the second coil part 70*a*, thus an influence of the magnetic flux on the property of the coil device can be reduced.

As shown in FIG. 1, in the present embodiment, the plate core 10 is arranged to the positive direction side of the drum core 20 along Z-axis. A plate core base face 10*a* of the plate core 10 is adhered to the first main body upper face 41*a* of the first main body part 41 of the first flange 40 and the second main body upper face 51*a* of the second main body part 51 of the second flange 50. The plate core 10 magnetically connects the first flange 40 and the second flange 50. The first flange 40, the winding core part 30, the second flange 50, and the plate core 10 form a closed magnetic circuit, thereby a magnetic loss can be reduced.

Also, as shown in FIG. 1, in the present embodiment, the plate core base face 10*a* of the plate core 10 is a flat face facing the winding core part 30. That is, in the present embodiment, there is no projection formed between the first coil part 60*a* and the second coil part 70*a* which would bend a magnetic flux. As such, since the plate core base face 10*a* of the plate core 10 is flat, the magnetic flux barely enters between the first coil part 60*a* and the second coil part 70*a*, and the influence of the magnetic flux on the property of the coil device can be reduced.

(Method of Producing Coil Device 1)

Next, a method of producing the coil device 1 as one embodiment of the present invention is described in detail.

For producing the coil device 1, first, the drum core 20, the plate core 10, the first wire 60, the second wire 70, and the terminals 81, 82, 91, 92 are prepared. The drum core 20 and the plate core 10 are formed using separate magnetic members, and these materials are preferably the same, however, different magnetic materials may be used.

As the magnetic material, for example, a magnetic material with relatively high permeability such as Ni—Zn based ferrite, Mn—Zn based ferrite, metal magnetic materials, and so on are mentioned as examples; and a powder of these magnetic materials is molded and sintered to produce a drum core and a plate core. The winding core part 30, the first flange 40, and the second flange 50 are integrally formed to the drum core 20 shown in FIG. 1.

Next, the first terminal 81 and the second terminal 82 are installed to the first flange 40. Also, the third terminal 91 and the fourth terminal 92 are installed to the second flange 50. At this time, the terminals and the flange may be adhered by placing a non-conductive adhesive in between.

The terminal is formed into the shape shown in FIG. 4 by bending a ribbon-form metal plate including phosphor, copper, tin, iron, zinc, a copper alloy such as phosphor bronze and brass, and so on as a main component. Further, regarding the terminal, a known plating layer such as nickel and tin may be formed to the surface at the other side from the flange. Note that, the terminal is not limited to a metal plate, and a metal paste may be applied and baked to the flange.

Next, as shown in FIG. 1, the first wire 60 is wound around the winding core part 30, and the first coil part 60*a* is formed. The wire can be wound around the winding core part using a known method such as using an auto-winding machine, or by hand.

As shown in FIG. 2A, the first winding end part 65*a* of the first wire 60 is pressed against the predetermined corner which is the boundary between the flat face 30*a* and the first side face 30*b*, then the first lead part 61 is bend and pulled out towards the first terminal first portion 81*a* of the first terminal 81. The first lead wire connecting part 63 which is the wire end of the first lead wire part 61 is connected to the first terminal first portion 81*a*.

The second winding end part 66*a* of the first wire 60 is pressed against the predetermined corner which is the boundary between the flat face 30*a* and the second side face 30*c*, and the second lead wire part 62 is bend and pulled out towards a second terminal first portion 82*a* of the second terminal 82. The second lead wire connecting part 64 which is the wire end of the second lead wire part 62 is connected to the second terminal first portion 82*a*.

As similar to the first wire 60, the second wire 70 is wound around the winding core part 30, and the second coil part 70*a* is formed.

The fourth winding end part 76*a* of the second wire 70 is pressed against the predetermined corner which is the boundary between the flat face 30*a* and the second side face 30*c*, and the fourth lead wire part 72 is bend and pulled out towards a fourth terminal first portion 92*a* of the fourth terminal 92. The fourth lead wire connecting part 74 which is the wire end of the fourth lead wire part 72 is connected to the fourth terminal first portion 92*a* of the fourth terminal 92.

The winding end part 75*a* of the second wire 70 is pressed against the predetermined corner which is the boundary between the flat face 30*a* and the first side face 30*b*, and the third lead wire part 71 is bend and pulled out towards a third terminal first portion 91*a* of the third terminal 91. The third lead wire connecting part 73 which is the wire end of the third lead wire part 71 is connected to the third terminal first portion 91*a*.

A method of connecting the wire and the terminal is not particularly limited, and for example, the lead wire connecting part is held between the first portion of each terminal and the first holding piece and second holding piece, and the lead wire connecting part is heat compressed to the first portion of each terminal, thereby the wire and the terminal can be connected. Note that, the insulation material coating the core of the wire melts by heat applied during the heat compression adhesion, hence a coating removal does not necessarily have to be done to the wire. The wire and the terminal may be connected by tying up the first lead wire connecting part to the first holding piece, or by using a laser welding, a bonding material such as solder, and so on.

Second Embodiment

A coil device 1*a* according to the present embodiment is basically the same as the first embodiment except that the arrangement of the winding end part is different. Hence, the common parts will not be explained, and parts which are different will be mainly described in below. The parts which are not explained in below are the same as the first embodiment.

Figure 5A:
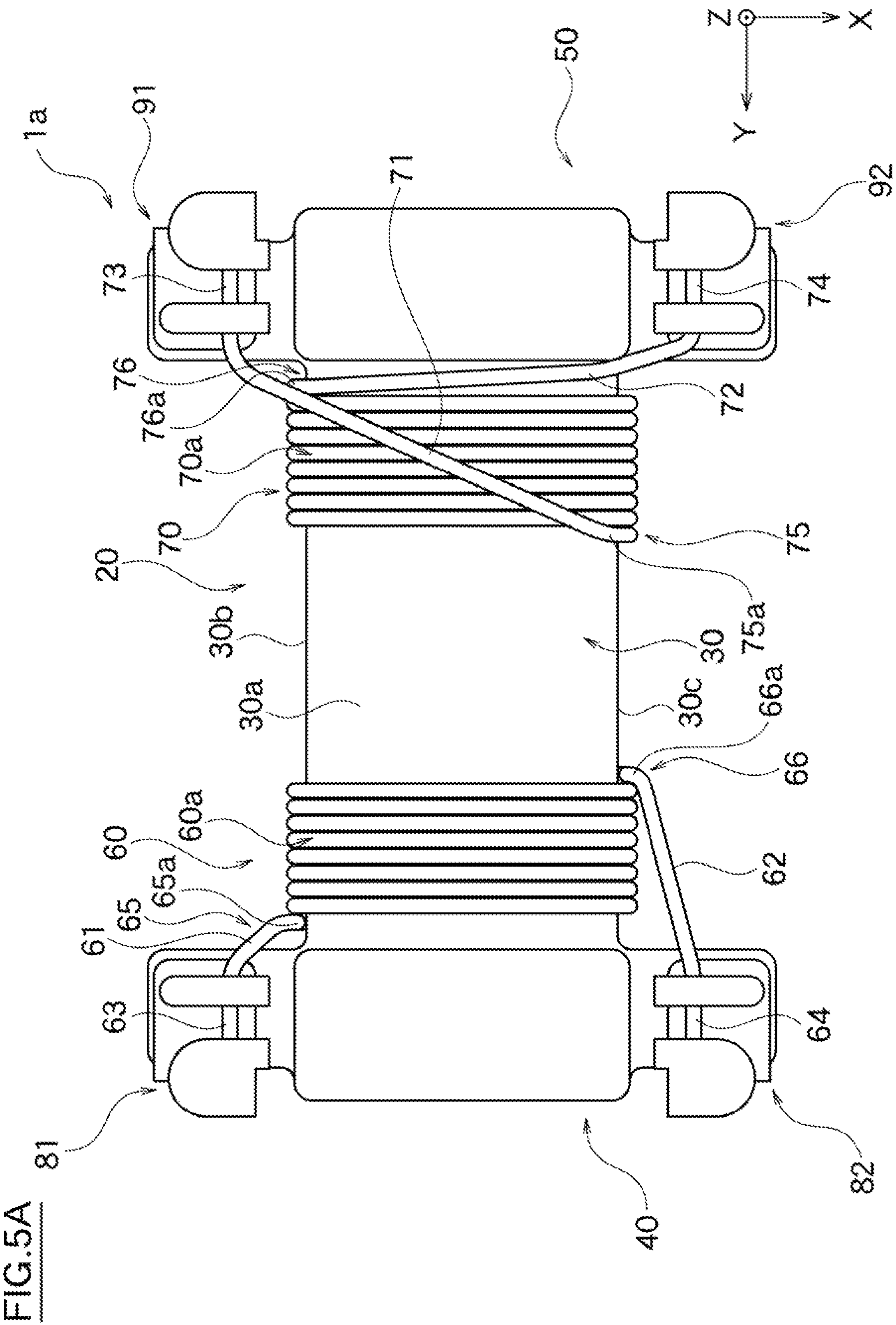
FIG. 5A is a plane diagram of a coil device according to another embodiment of the present invention.

As shown in FIG. 5A, in the present embodiment, the first winding end part 65*a* is arranged at the corner which is the boundary between the first side face 30*b* and the base face of the winding core part 30. The first lead wire part 61 bends at the first winding end part 65*a*, and the first lead wire part 61 is pulled out towards the first lead wire connecting position 81*a*1 where the first terminal 81 and the first lead wire connecting part 63 connect.

Figure 5B:
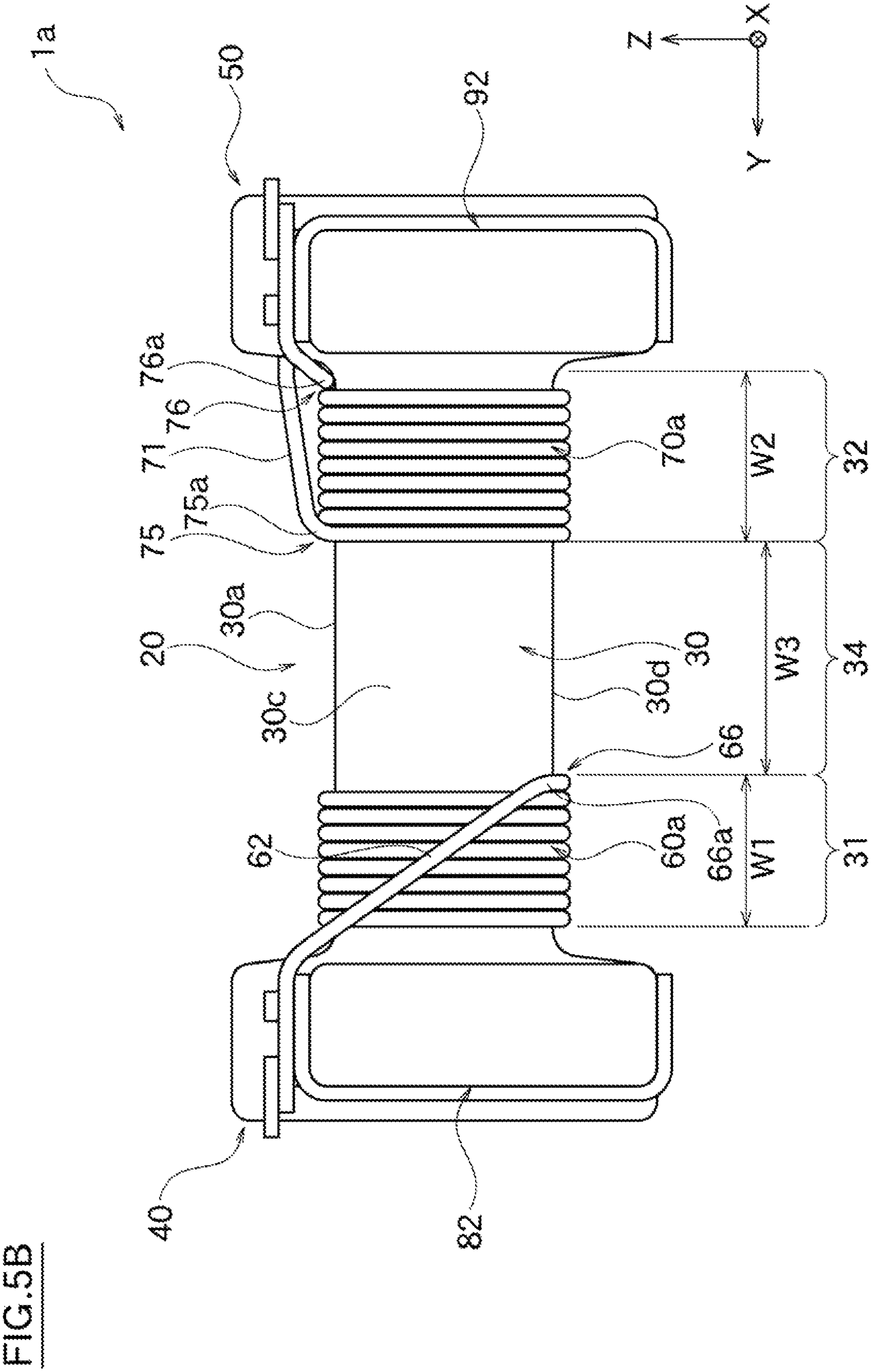
FIG. 5B is a side diagram of the coil device shown in FIG. 5A.

As shown in FIG. 5B, the second winding end part 66*a* is arranged at the corner which is the boundary between the second side face 30*c* and the base face 30*d* of the winding core part 30. The second lead wire part 62 bends at the second winding end part 66*a*, and the second lead wire part 62 is pulled out towards the second connecting position

82*a*1 where the second terminal 82 and the second lead wire connecting part 64 connect. Thus, the second lead wire part 62 is pulled out to the negative direction of X-axis by crossing over the first coil part 60*a*.

As shown in FIG. 5A, the third winding end part 75*a* is arranged at the corner which is the boundary between the first side face 30*b* and the flat face 30*a* of the winding core part 30. The third lead wire part 71 bends at the winding end part 75*a*, and the third lead wire part 71 is pulled out towards the third connecting position 91*a*1 where the third terminal 91 and the third lead wire connecting part 73 connect. Thus, the third lead wire part 71 is pulled out to the positive direction of Z-axis by crossing over the second coil part 70*a*.

The fourth winding end part 76*a* is arranged at the corner which is the boundary between the second side face 30*c* and the flat face 30*a* of the winding core part 30. The fourth lead wire part 72 bends at the fourth winding end part 76*a*, and the fourth lead wire part 72 is pulled out towards the fourth connecting position 92*a*1 where the fourth terminal 92 and the fourth lead wire connecting part 74 connect.

In the present embodiment, by arranging the winding end part in such way, the wire can bend with smaller angle at the winding end part compared to the first embodiment. Thus, the coil device 1*a* of the present embodiment has a shape that the wire can be wound easily using an auto-winding machine.

Note that, the present invention is not limited to the above-mentioned embodiments, and various modifications are possible within the scope of the present invention.

For example, the wire end part does not have to be arranged at the corner of the outer face of the winding core part, and it may be arranged on the middle of outer face. Specifically, the third winding end part 75*a* of the second wire 70 shown in FIG. 2A may be arranged in the middle along X-axis of the flat face 30*a* of the winding core part 30. Also, the fourth winding end part 76*a* of the second wire 70 may be arranged in the middle along X-axis of the flat face 30*a*.

EXAMPLES (Lead Wire Switching Test)

A coil device 1*a* according to the second embodiment shown in FIG. 5A was used as Example 1. In the coil device 1*a* according to Example 1, a first winding width W1 was 0.74 mm, a second winding width W2 was 0.73 mm, and a distance W3 between coil parts was 1.18 mm. A conventional coil device was used as Comparative example 1. The coil device according to Comparative example 1 was basically the same as Example 1 except that positions where a first lead wire part 61 and a fourth lead wire part 72 were pulled out were different. That is, in Comparative example 1, the first lead wire part 61 of the first wire 60 was pulled out towards a fourth terminal 92 of a second flange 50 side; and the fourth lead wire part 72 of the second wire 70 was pulled out towards a first terminal 81 of a first flange 40 side. In the coil device according to Comparative example 1, a first winding width W1 was 0.75 mm, a second winding width W2 was 0.71 mm, and a distance W3 between coil parts was 1.18 mm.

For the coil device 1*a* according to Example 1 and the coil device according to Comparative example 1, a capacitance (stray capacitance) between the first coil part 60*a* and the second coil part 70*a* were measured. Results are shown in FIG. 6.

Figure 7:
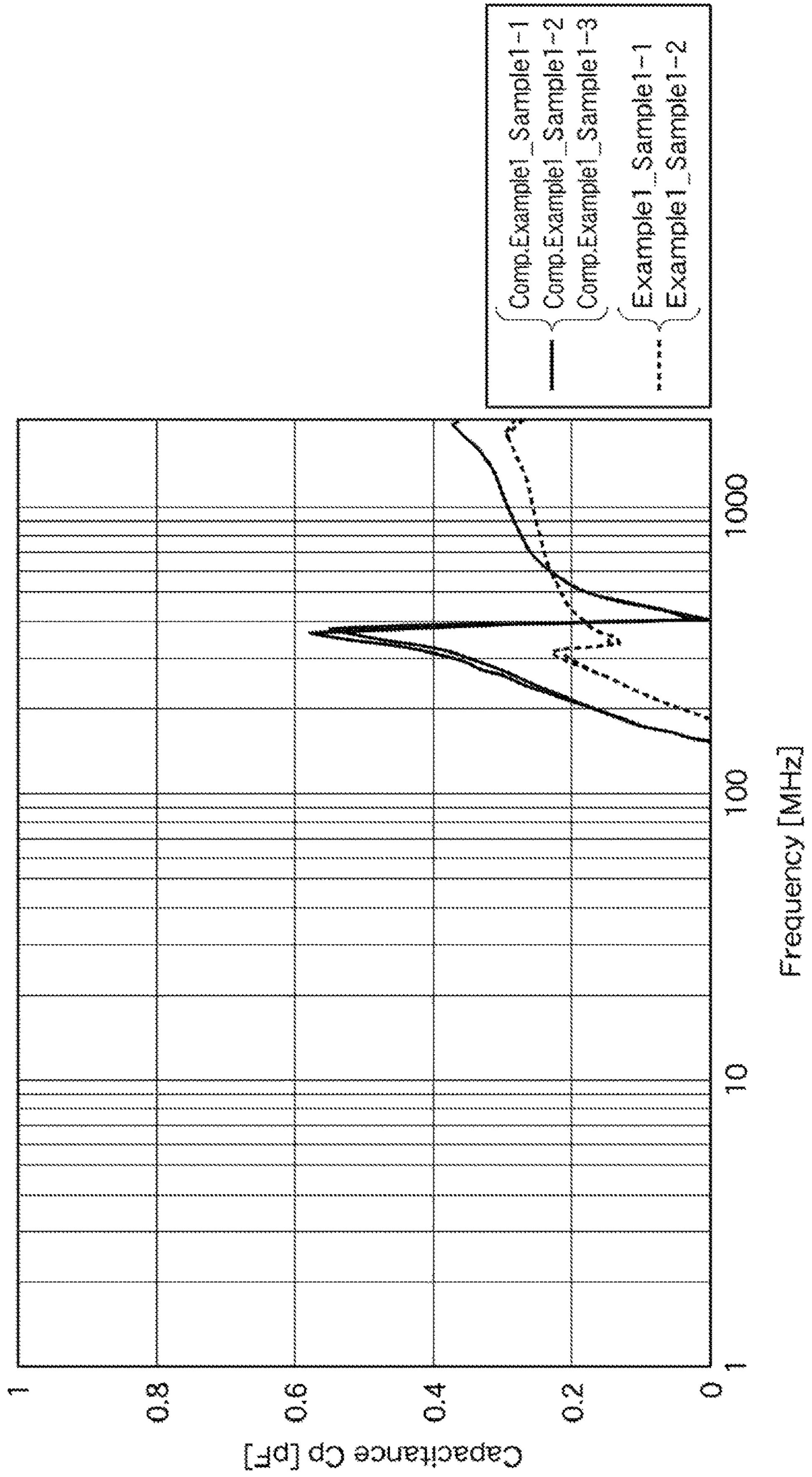
FIG. 7 is a graph showing a relationship between a stray capacitance and a frequency of applied voltage regarding the coil device as a whole of Examples and Comparative examples.

Also, for each of the coil device 1*a* according to Example 1 and the coil device according to Comparative example 1, a capacitance of each coil device as a whole was measured. Results are shown in FIG. 7.

Figure 6:
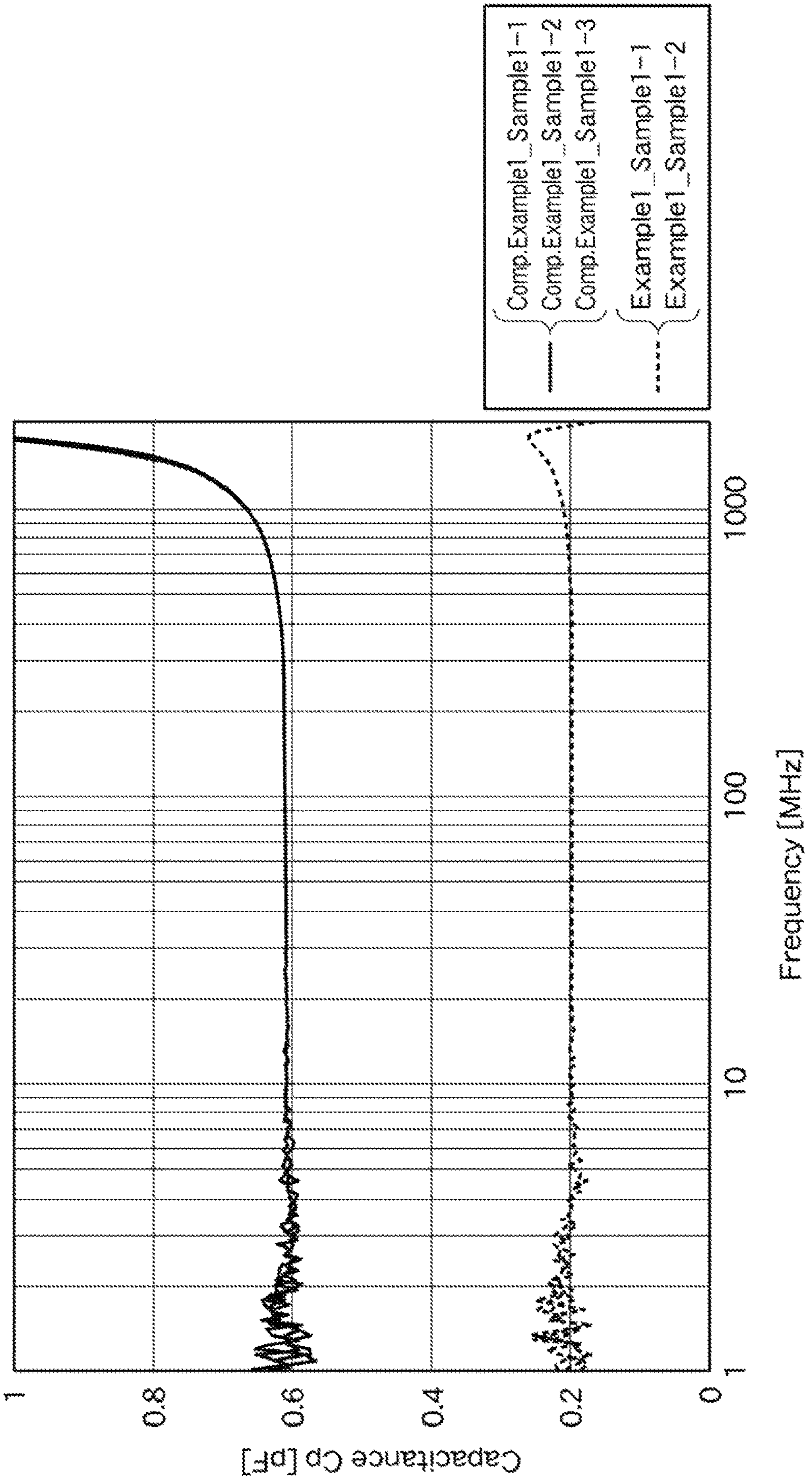
FIG. 6 is a graph showing a relationship of a stray capacitance and a frequency of applied voltage between the coil parts of the coil device according to Examples and Comparative examples.

Regarding the stray capacitance between the first coil part and the second coil part shown in FIG. 6, when a frequency of applied voltage was 1 GHz, an average from each sample of Example 1 was 0.203 pF, and an average from each sample of Comparative example 1 was 0.666 pF. Also, regarding the stray capacitance of the coil device as a whole as shown in FIG. 7, when a frequency of applied voltage was 1 GHz, an average from each sample of Example 1 was 0.257 pF, and an average from each sample of Comparative example 1 was 0.294 pF.

According to these results, by switching the position where the first lead wire part 61 and the fourth lead wire part 72 were pulled out, it was possible to reduce a stray capacitance of the coil device.

(Winding End Part Changing Test)

The coil device 1 according to the first embodiment shown in FIG. 2A was used for Example 2. The coil device 1 according to Example 2 had the same first winding width W1, second winding width W2, and distance W3 as the coil device according to Example 1. A capacitance (stray capacitance) at the first coil part 60*a* of the coil device according to Example 1 was measured, and a capacitance (stray capacitance) at the first coil part 60*a* of the coil device according to Example 2 was measured. Results are shown in FIG. 8.

Figure 9:
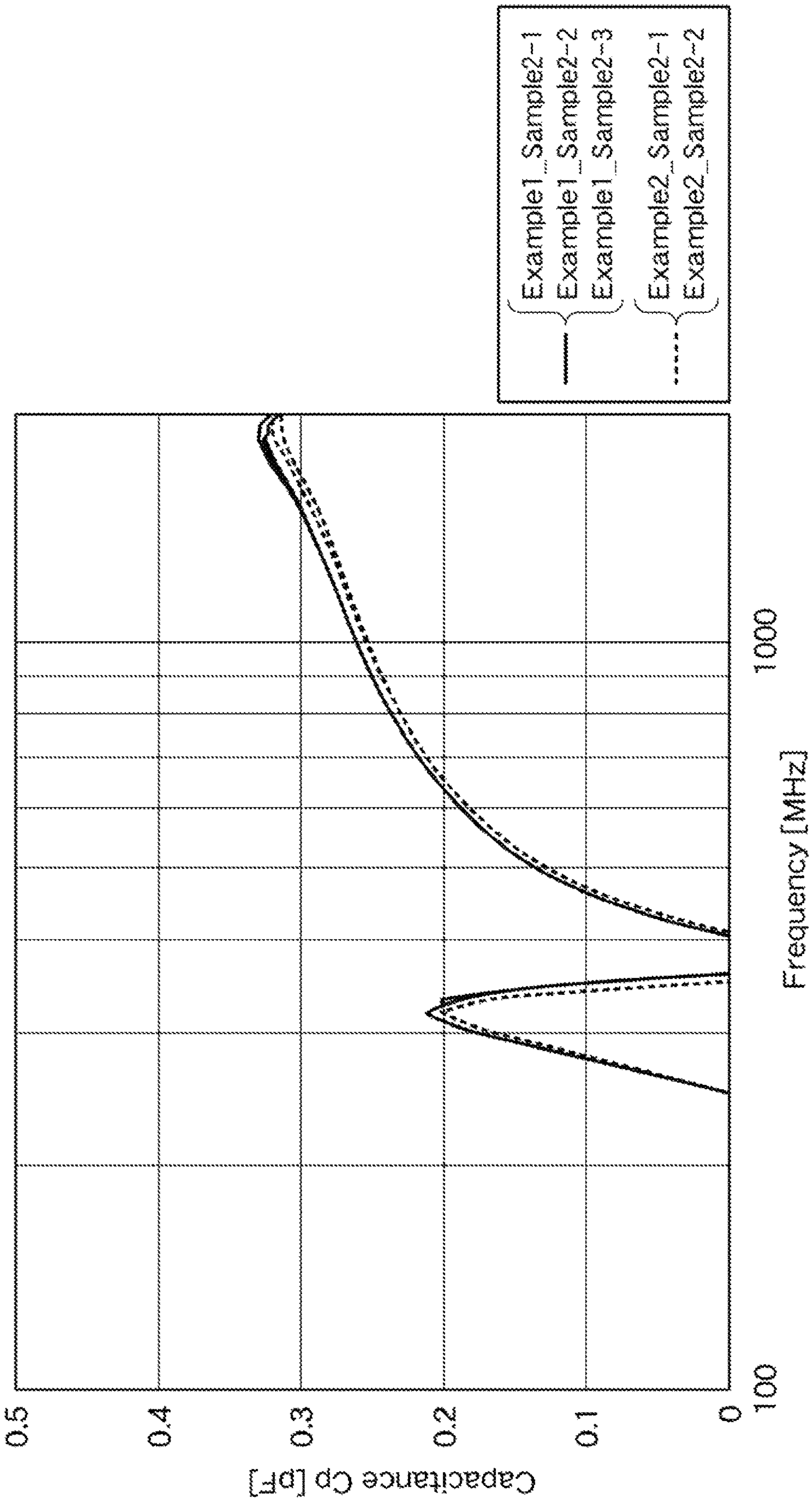
FIG. 9 is a graph showing a relationship between a stray capacitance and a frequency of applied voltage regarding the other coil part of the coil device according to Examples.

Also, a capacitance (stray capacitance) at the second coil part 60*b* of the coil device according to Example 1 was measured, and a capacitance (stray capacitance) at the second coil part 60*b* of the coil device Example 2 was measured. Results are shown in FIG. 9.

Figure 10:
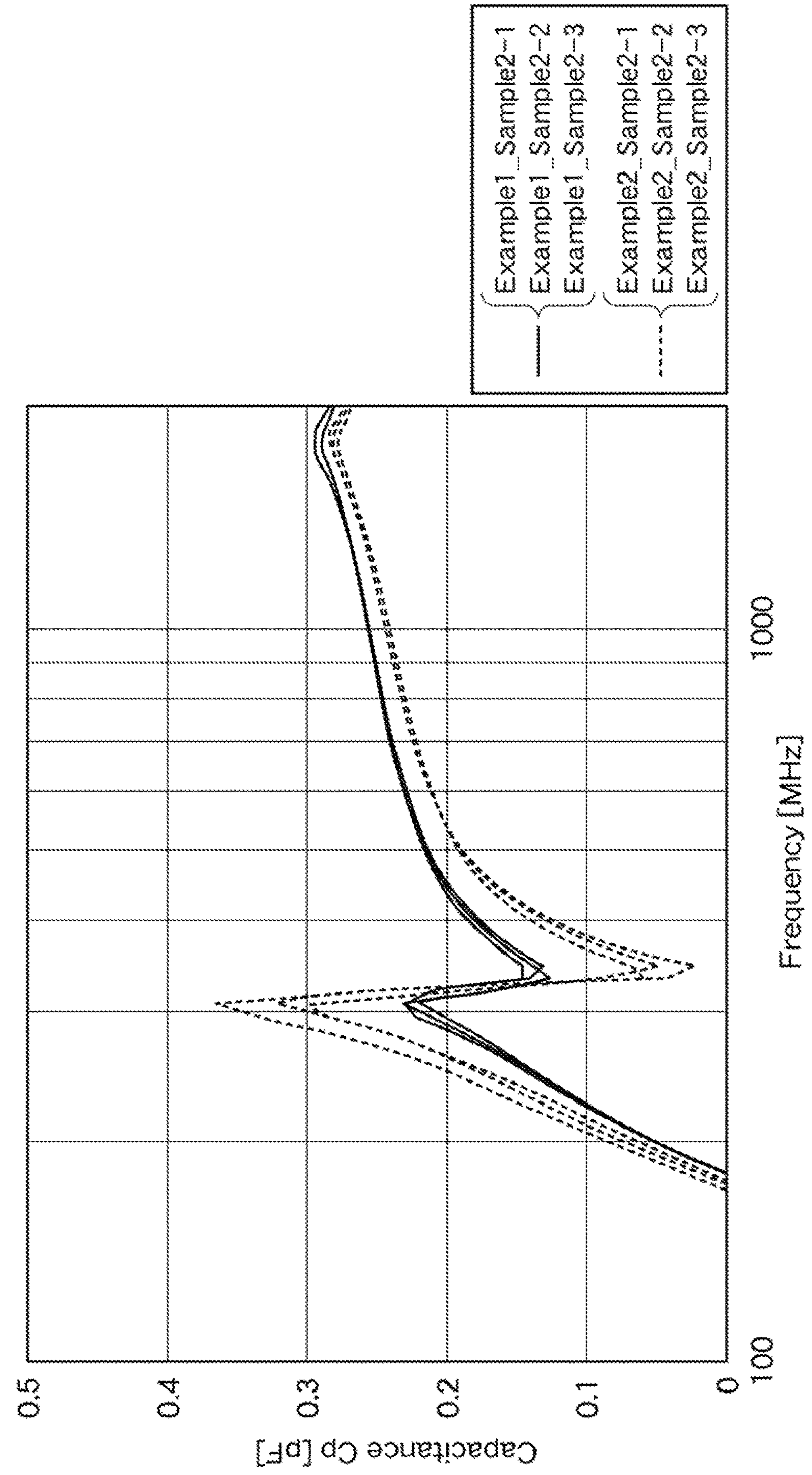
FIG. 10 is a graph showing a relationship between a stray capacitance and a frequency of applied voltage regarding the coil device as a whole according to Examples.

Also, a capacitance (stray capacitance) of the coil device as a whole of Example 1 was measured, and a capacitance (stray capacitance) of the coil device as a whole of Example 2 was measured. Results are shown in FIG. 10.

Figure 8:
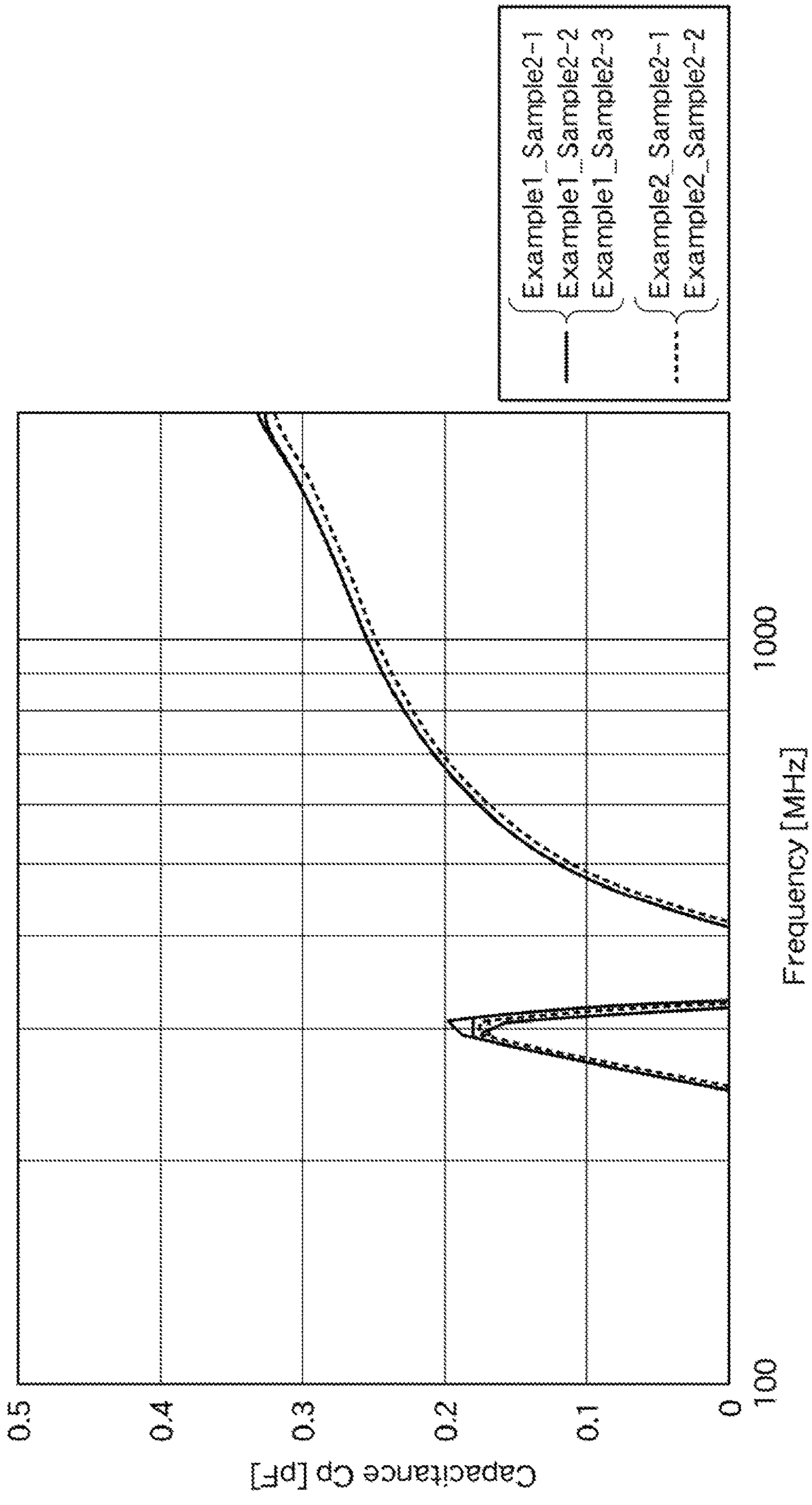
FIG. 8 is a graph showing a relationship between a stray capacitance and a frequency of applied voltage regarding one coil part of the coil device according to Examples.

Regarding a stray capacitance at the first coil shown in FIG. 8, when a frequency of the applied voltage was 1 GHz, an average from each sample of Example 1 was 0.257 pF, and an average from each sample of Example 2 was 0.251 pF. Also, regarding the stray capacitance at the second coil shown in FIG. 9, when a frequency of the applied voltage was 1 GHz, an average from each sample of Example 1 was 0.263 pF, and an average from each sample of Example 2 was 0.256 pF. Also, regarding a stray capacitance of the coil device as a whole shown in FIG. 10, when a frequency of the applied voltage was 1 GHz, an average from each sample of Example 1 was 0.257 pF, and an average from each sample of Example 2 was 0.244 pF.

According to these results, by shortening the lengths of lead wire parts by changing the arrangement of the first winding end part, second winding end part, third winding end part, and fourth winding end part, it was possible to reduce a stray capacitance of the coil device.

(Inter-Coil Distance Changing Test)

The coil device 1 according to the first embodiment shown in FIG. 2A was used as a coil device of Comparative example 2, and the first winding width W1 was 0.76 mm, the second winding width W2 was 0.75 mm, and the distance W3 between the coil parts was 1.16 mm. A capacitance (stray capacitance) between the first coil part 60*a* and the second coil part 70*a* of the coil device according to Example 2 was measured, and a capacitance (stray capacitance) between the first coil part 60*a* and the second coil part 70*a* of the coil device according to Comparative example 2 was measured. Results are shown in FIG. 11.

Figure 12:
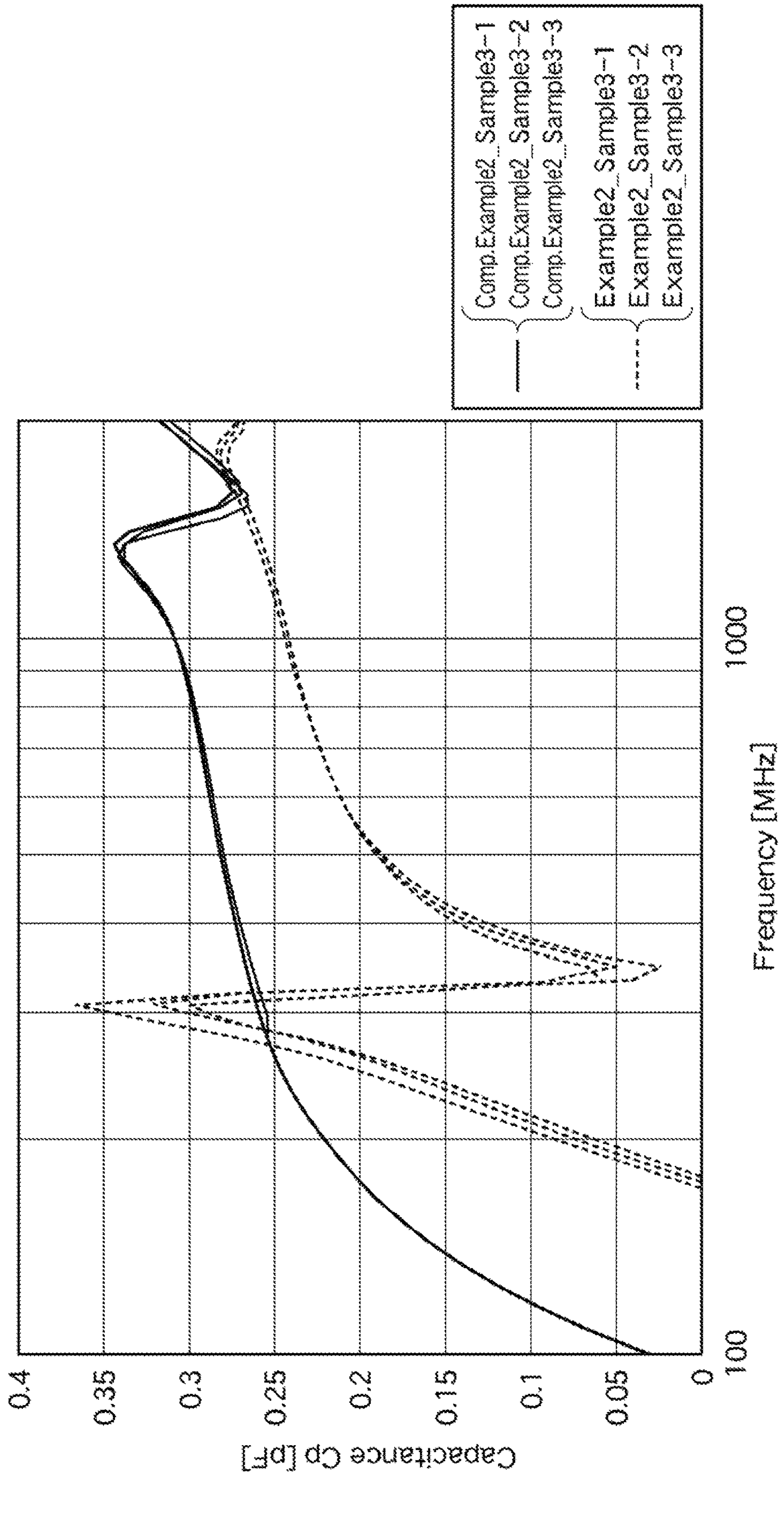
FIG. 12 is a graph showing a relationship between a stray capacitance and a frequency of applied voltage regarding the coil device as a whole according to Examples and Comparative examples.

Also, using the coil device according to Example 2 and the coil device according to Comparative example 2, a capacitance of a coil device as a whole for each case was measured. Results are shown in FIG. 12.

Figure 11:
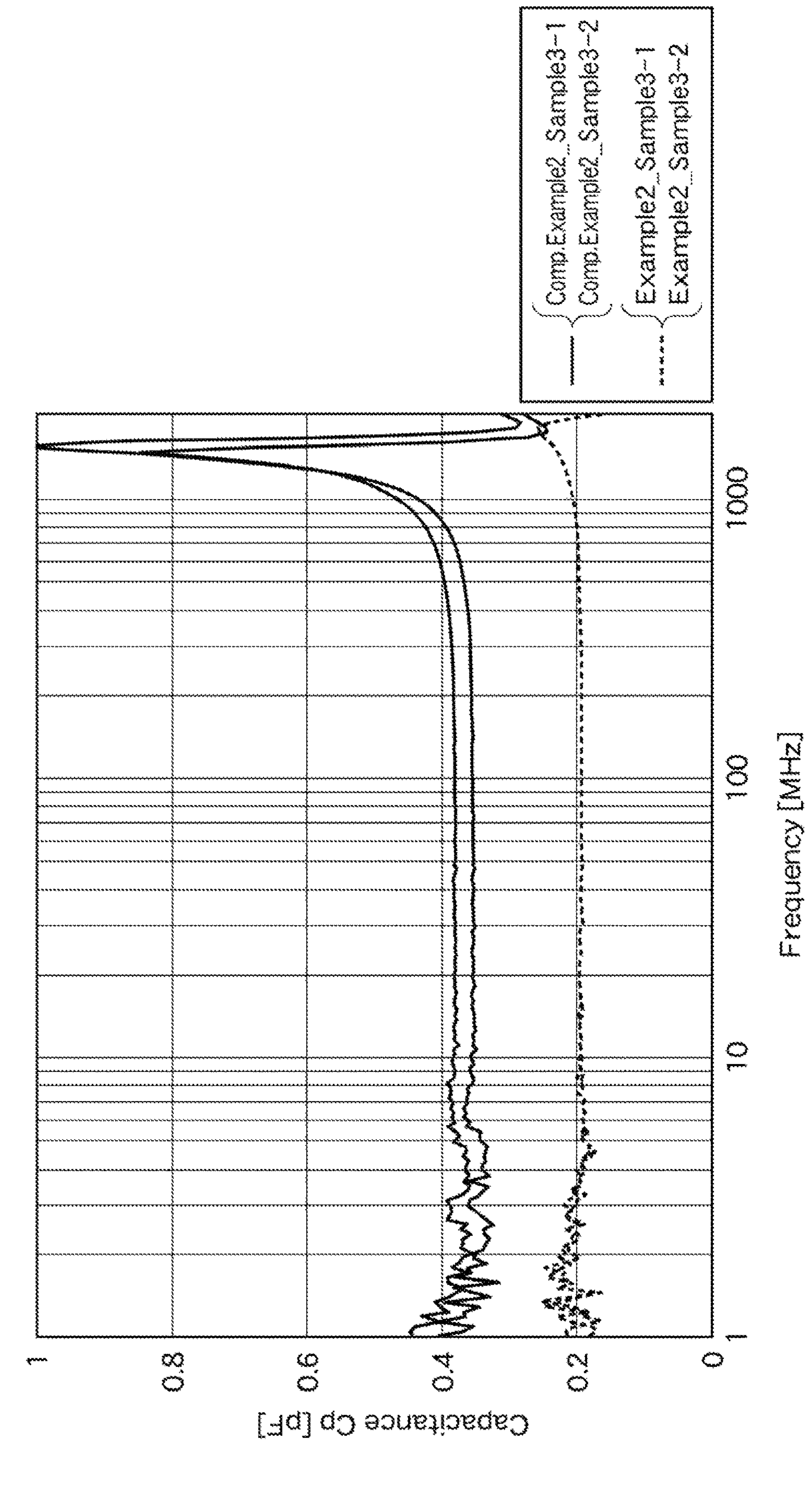
FIG. 11 is a graph showing a relationship of a stray capacitance and a frequency of applied voltage between the coil parts of the coil device according to Examples and Comparative examples.

Regarding the stray capacitance between the first coil and the second coil part shown in FIG. 11, when a frequency of the applied voltage was 1 GHz, an average from each sample of Example 2 was 0.203 pF, and an average from each sample of Comparative example 2 was 0.457 pF. Also, regarding the stray capacitance of the coil device as a whole as shown in FIG. 12, when a frequency of the applied voltage was 1 GHz, an average from each sample of Example 2 was 0.244 pF, and an average from each sample of Comparative example 2 was 0.311 pF.

According to these results, by making the distance W3 between the coil parts longer than the first winding width W1 and the second winding width W2, the stray capacitance of the coil device can be reduced.

NUMERICAL REFERENCES

1, 1*a* . . . Coil device
10 . . . Plate core
10*a* . . . Plate core base face
20 . . . Drum core
30 . . . Winding core part
30*a* . . . Upper face (flat face)
30*b* . . . First side face
30*c* . . . Second side face
30*d* . . . Base face
33 . . . Center position
40 . . . First flange
41 . . . First main body part
41*a* . . . First main body upper face
41*b* . . . First main body front face
41*c* . . . First main body back face
41*c*1 . . . Connecting portion
41*d* . . . First main body first side face
41*e* . . . First main body second side face
41*f* . . . First main body base face
42 . . . First sub-body part
42*a* . . . First sub-body upper face
42*b* . . . First sub-body front face
42*c* . . . First sub-body back face
42*d* . . . First sub-body side face
42*f* . . . First sub-body base face
43 . . . Second sub-body part
43*a* . . . Second sub-body upper face
43*b* . . . Second sub-body front face
43*c* . . . Second sub-body back face
43*e* . . . Second sub-body side face
43*f* . . . Second sub-body base face
50 . . . Second flange
51 . . . Second main body part
51*a* . . . Second main body upper face
51*b* . . . Second main body front face
51*c* . . . Second main body back face
51*c*1 . . . Connecting portion
51*d* . . . Second main body first side face
51*e* . . . Second main body second side face
51*f* . . . Second main body base face
52 . . . Third sub-body part
52*a* . . . Third sub-body upper face
52*b* . . . Third sub-body front face
52*c* . . . Third sub-body back face
52*d* . . . Third sub-body side face
52*f* . . . Third sub-body base face
53 . . . Fourth sub-body part
53*a* . . . Fourth sub-body upper face
53*b* . . . Fourth sub-body front face
53*c* . . . Fourth sub-body back face
53*e* . . . Fourth sub-body side face
53*f* . . . Fourth sub-body base face
60 . . . First wire
60*a* . . . First coil part
61 . . . First lead wire part
62 . . . Second lead wire part
63 . . . First lead wire connecting part
64 . . . Second lead wire connecting part
65 . . . First outer winding wire portion
65*a* . . . First winding end part
66 . . . First inner winding wire portion
66*a* . . . Second winding end part
70 . . . Second wire
70*a* . . . Second coil part
71 . . . Third lead wire part
72 . . . Fourth lead wire part
73 . . . Third lead wire connecting part
74 . . . Fourth lead wire connecting part
75 . . . Second inner winding wire portion
75*a* . . . Third winding end part
76 . . . Second outer winding wire portion
76*a* . . . Fourth winding end part
81 . . . First terminal
81*a* . . . First terminal first portion
81*a*1 . . . First connecting position
81*b* . . . First connection part
81*c* . . . First holding piece
81*d* . . . Second holding piece
81*f* . . . First terminal second portion
82 . . . Second terminal
82*a* . . . Second terminal first portion
82*a*1 . . . Second connecting position
82*b* . . . Second connection part
82*c* . . . First holding piece
82*d* . . . Second holding piece
82*f* . . . Second terminal second portion
91 . . . Third terminal
91*a* . . . Third terminal first portion
91*a*1 . . . Third connecting position
91*b* . . . Third connection part
91*c* . . . First holding piece
91*d* . . . Second holding piece
91*f* . . . Third terminal second portion
92 . . . Fourth terminal
92*a* . . . Fourth terminal first portion
92*a*1 . . . Fourth connecting position
92*b* . . . Fourth connection part
92*c* . . . First holding piece
91*d* . . . Second holding piece
92*f* . . . Fourth terminal second portion

What is claimed is:

1. A coil device comprising a first wire, a second wire, and a drum core having a winding core part where the first wire and the second wire are wrapped around;

wherein the drum core has a first flange at one end along a first axis of the winding core part and a second flange at the other end along the first axis of the winding core part;

the first flange has a first terminal and a second terminal connecting to the first wire;

the second flange has a third terminal and a fourth terminal connecting to the second wire;

the first wire has a first coil part wound around the winding core part by pressing a back of the first coil part towards the winding core part;

the first coil part has a first winding width W1 defined by components along the first axis which is a distance between a first outer winding wire portion positioned closest to the first flange and a first inner winding wire portion positioned furthest from the first flange;

the second wire comprises a second coil part wound around the winding core part by pressing a back of the second coil part towards the winding core part;

the second coil part has a second winding width W2 defined by components along the first axis which is a distance between a second outer winding wire portion positioned closest to the second flange and a second inner winding wire portion positioned furthest from the second flange;

the first coil part is arranged at a position closer to the first flange and spaced apart from the second coil part by a distance W3 defined by components along the first axis between the first inner winding wire portion and the second inner winding wire portion;

W3>W1 and W3>W2 are satisfied; and the first wire and the second wire are different wires.

2. The coil device according to claim 1, wherein a first connecting position where the first terminal and the first wire connect and a second connecting position where the second terminal and the first wire connect are arranged at a first direction side along a second axis perpendicular to the first axis of the first flange, and a third connecting position where the third terminal and the second wire connect and a fourth connecting position where the fourth terminal and the second wire connect are arranged at the first direction side along the second axis of the second flange.

3. The coil device according to claim 2, wherein the first connecting position is arranged at an opposite side of the second connecting position while placing a connecting portion connecting the first flange and the winding core part between the first connecting position and the second connecting position along a direction of the third axis being perpendicular to the first axis and the second axis; and the third connecting position is arranged at an opposite side of the fourth connecting position while placing a connecting portion connecting the second flange and the winding core part between the third connecting position and the fourth connecting position along the direction of the third axis.

4. The coil device according to claim 2, wherein the first wire bends at a first winding end part which is one end of the first coil part towards the first connecting position and away from the first coil part, the first wire bends at a second winding end part which is the other end of the first coil part towards the second connecting position and away from the first coil part, the second wire bends at a third winding end part which is one end of the second coil part towards the third connecting position and away from the second coil part, and the second wire bends at a fourth winding end part which is the other end of the second coil part towards the fourth connecting position and away from the second coil part.

5. The coil device according to claim 2, wherein the first terminal comprises a first terminal first portion having a plane perpendicular to the second axis, a first terminal second portion arranged at an opposite side of the first terminal first portion across the first flange along the direction of the second axis and has a plane parallel to the first terminal first portion, and a first connection part connecting the first terminal first portion and the first terminal second portion;

the second terminal comprises a second terminal first portion having a plane perpendicular to the second axis, a second terminal second portion arranged at an opposite side of the second terminal first portion across the first flange along the direction of the second axis and has a plane parallel to the second terminal first portion, and a second connection part connecting the second terminal first portion and the second terminal second portion;

the third terminal comprises a third terminal first portion having a plane perpendicular to the second axis, a third terminal second portion arranged at an opposite side of the third terminal first portion across the second flange along the direction of the second axis and has a plane parallel to the third terminal first portion, and a third connection part connecting the third terminal first portion and the third terminal second portion; and the fourth terminal comprises a fourth terminal first portion having a plane perpendicular to the second axis, a fourth terminal second portion arranged at an opposite side of the fourth terminal first portion across the second flange along the direction of the second axis and has a plane parallel to the fourth terminal first portion, and a fourth connection part connecting the fourth terminal first portion and the fourth terminal second portion.

6. The coil device according to claim 2, wherein a first terminal second portion, a second terminal second portion, a third terminal second portion, and a fourth terminal second portion are arranged on a same plane in a mountable way which is perpendicular to the second axis and at a second direction side which is an opposite side of the first direction side along the second axis.

7. The coil device according to claim 2, wherein the winding core part has a flat plane to the first direction side along the second axis.

8. The coil device according to claim 2, wherein a ratio between a number of turns of the first coil part and a number of turns of the second coil part is 0.75 to 1/0.75.

9. The coil device according to claim 1 comprising a plate core magnetically connecting the first flange and the second flange.

10. The coil device according to claim 9, wherein the plate core has a flat plate-like core base surface which opposes the winding core part.

11. The coil device according to claim 1, wherein:

the first wire comprises a first lead wire part connected to the first terminal by extending from a first winding end part as one end of the first coil part, and a second lead wire part connected to the second terminal by extending from a second winding end part as the other end part of the first coil part, the second wire comprises a third lead wire part connected to the third terminal by extending from a third winding end part as one end of the second coil part, and a fourth lead wire part connected to the fourth terminal by extending from a fourth winding end part as the other end part of the second coil part, the first winding end part is arranged at the first outer winding wire portion of the first coil part, the second winding end part is arranged at the first inner winding wire portion of the first coil part, the third winding end part is arranged at the second inner winding wire portion of the second coil part, and the fourth winding end part is arranged at the second outer winding wire portion of the second coil part.

12. The coil device according to claim 1, wherein the first winding width W1 is 1.14 to 1.18 mm.

* * * * *